(12) United States Patent
Singh et al.

(10) Patent No.: US 12,549,435 B2
(45) Date of Patent: Feb. 10, 2026

(54) FAILURE DETECTION AND RECOVERY TECHNIQUES FOR CONVERGED NETWORK ADAPTORS

(71) Applicant: Oracle International Corporation, Redwood Shores, CA (US)

(72) Inventors: Brijesh Singh, Mercer Island, WA (US); Eden Adogla, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/307,727

(22) Filed: Apr. 26, 2023

(65) Prior Publication Data

US 2024/0364586 A1 Oct. 31, 2024

(51) Int. Cl.
*G06F 15/177* (2006.01)
*H04L 41/0803* (2022.01)
*H04L 43/08* (2022.01)

(52) U.S. Cl.
CPC .......... *H04L 41/0803* (2013.01); *H04L 43/08* (2013.01)

(58) Field of Classification Search
CPC ............................ H04L 41/0803; H04L 43/08
USPC ........................................................ 709/222
See application file for complete search history.

(56) References Cited

U.S. PATENT DOCUMENTS

| 7,594,219 | B2 | 9/2009 | Ramachandran et al. |
| 11,137,992 | B2 | 10/2021 | Arif et al. |
| 11,340,881 | B2 | 5/2022 | Gondi et al. |
| 11,442,848 | B1 | 9/2022 | Crenshaw et al. |
| 2003/0023839 | A1 | 1/2003 | Burkhardt et al. |
| 2015/0244574 | A1* | 8/2015 | Pirko .................. H04L 41/0806 370/254 |
| 2015/0309829 | A1* | 10/2015 | Hiltgen ................... G06F 21/53 718/1 |
| 2020/0125662 | A1* | 4/2020 | Zhu ....................... H04L 67/535 |

(Continued)

FOREIGN PATENT DOCUMENTS

WO 2022108676 A1 5/2022

OTHER PUBLICATIONS

"Bare Metal Boot Options", Progress Kemp, Available Online at: https://support.kemptechnologies.com/hc/en-us/articles/207797043-Bare-Metal-Boot-Options, Jun. 24, 2022, 4 pages.

(Continued)

*Primary Examiner* — Vivek Srivastava
*Assistant Examiner* — Karina J Garcia-Ching
(74) *Attorney, Agent, or Firm* — Kilpatrick Townsend & Stockton LLP

(57) ABSTRACT

Techniques discussed herein relate to monitoring and/or detecting destabilization events of a host machine of a cloud computing environment. At least some of these destabilization events can be associated with a converged network adaptor of the host machine. The converged network adaptor may include a combination of functionality of a host network interface card (NIC) and functionality associated with a smart adaptor (e.g., a smart NIC). The smart adaptor may be configured to use at the host machine. A converged infrastructure management service may monitor operational data associated with the host machine to identify destabilization events that may be associated with the converged network adaptor. One or more remedial actions may be identified based at least in part on identifying these destabilizing events.

19 Claims, 13 Drawing Sheets

(56) References Cited

U.S. PATENT DOCUMENTS

2020/0387357 A1 12/2020 Mathon et al.
2021/0226846 A1* 7/2021 Ballard .............. H04L 41/0843
2023/0011452 A1* 1/2023 Barber .............. G06F 16/24558

OTHER PUBLICATIONS

"Bare Metal Tests and Hardware-Software Co-Verification", Available Online at: https://community.cadence.com/cadence_blogs_8/b/sd/posts/bare-metal-tests-and-hardware-software-co-verification, Jan. 23, 2017, 3 pages.
"Hardware Features Available with Virtual Machine Compatibility Settings", VMware vSphere, Aug. 6, 2021, 4 pages.
"Troubleshoot Live Migration Issues", Available Online at: https://docs.microsoft.com/en-us/troubleshoot/windows-server/virtualization/troubleshoot-live-migration-issues, Dec. 1, 2021, 22 pages.
"Virtual Machine Compatibility", VMware vSphere, Aug. 6, 2021, 4 pages.
Flecha , "Hardware Compatibility Checks in vLCM", VMware Virtual Blocks Blog, Jun. 11, 2020, 4 pages.
U.S. Appl. No. 18/053,170, Non-Final Office Action, mailed on Apr. 29, 2025, 11 pages.

* cited by examiner

FAILURE DETECTION AND RECOVERY TECHNIQUES FOR CONVERGED NETWORK ADAPTORS

BACKGROUND

Cloud-based platforms have become increasingly common. These platforms manage large amounts of data on behalf of various users in a multi-tenant environment. Within a multi-tenant environment, it is desirable to encapsulate network traffic of one tenant from the network traffic of another. A virtual or overlay network (also referred to as a "virtual cloud network (VCN)" may be used for this encapsulation. Conventionally, functionality for managing the network traffic between VCNs was provided in separate computing component (e.g., a "smart NIC"), different from the host machine's network interface card (referred to as "a host NIC"). However, these separate computing components take up physical space and draw power from the server, which leads to a suboptimal use of physical resources. The disclosed techniques address these deficiencies, individually, and collectively.

SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may comprise configuring, by a converged infrastructure management service of the cloud computing environment, a smart adaptor of a converged network adaptor for use at a host machine of the cloud computing environment. In some embodiments, the converged network adaptor may comprise first functionality associated with a host network interface card and second functionality associated with the smart adaptor. The host network interface card may be visible to a host operating system executing at the host machine. The method may further comprise monitoring, by the converged infrastructure management service of the cloud computing environment, operational data corresponding to the host machine. The method may further comprise identifying, by the converged infrastructure management service of the cloud computing environment, a destabilization event that is associated with the converged network adaptor based at least in part on the monitoring. The method may further comprise performing, by the converged infrastructure management service of the cloud computing environment, one or more remedial actions based at least in part on identifying the destabilization event.

In some embodiments, the smart adaptor is configured with one or more features, and configuring the smart adaptor may comprise determining, based at least in part on an identifier corresponding to the host machine, a subset of permitted features selected from the one or more features of the smart adaptor. In some embodiments, the subset of permitted features may be features that are permitted to be utilized at the host machine. Configuring the smart adaptor may further comprise executing operations to cause the smart adaptor to 1) expose an interface associated with the subset of permitted features, or 2) restrict access to features other than the subset of permitted features.

In some embodiments, the one or more features of the smart adaptor may comprise at least one of: 1) providing cryptographic operations, 2) providing storage that is remote with respect to storage provided by the host machine, 3) providing virtual cloud network management operations.

In some embodiments, the method may further comprise initiating an auto-qualification process for pre-testing one or more images with the converged network adaptor and/or booting, at a second host machine, each of the one or more images. In some embodiments, the second host machine may be configured to operate into an isolated network and configured with an instance of the converge network adaptor. The method may further comprise associating each of the one or more images with a label that indicates a respective image is stable or unstable based at least in part on identifying whether a given image booted fully at the second host machine. In some embodiments, a corresponding image that is associated with an unstable label indicating the corresponding image is unstable may be restricted from being deployed to infrastructure components, including the host machine, that are configured with the converged network adaptor.

In some embodiments, identifying the destabilization event further comprises providing input to a machine learning model trained to identify destabilization events from input data. In some embodiments, the machine learning model may be previously trained using a supervised learning algorithm and training data comprising training data examples individually being associated with operational data, or data generated from operational data, and a known destabilization event label.

In some embodiments, the operational data may be obtained from at least one of: 1) an integrated lights out manager, 2) a baseboard management controller, 3) an agent operating at an operating system executing at the host machine, 4) a load balancer associated with the host machine, 5) the smart adaptor, or 6) the host network interface card of the host machine.

In some embodiments, the operational data comprises at least one: 1) a reboot duration value, 2) a panic idle power draw value, 3) console logs or console log related data, 4) system event logs or system event log related data, 5) CPU power consumption data, or 6) network traffic flow data.

Systems, devices, and computer media are disclosed herein, each of which may comprise one or more memories on which instructions corresponding to the methods disclosed herein may be stored. The instructions may be executed by one or more processors of the disclosed systems and devices to execute the methods disclosed herein. One or more computer programs can be configured to perform particular operations or actions corresponding to the described methods by virtue of including instructions that, when executed by data processing apparatus, cause the apparatus to perform the actions.

BRIEF DESCRIPTION OF THE DRAWINGS

Various embodiments in accordance with the present disclosure will be described with reference to the drawings, in which.

DETAILED DESCRIPTION

Figure 1:
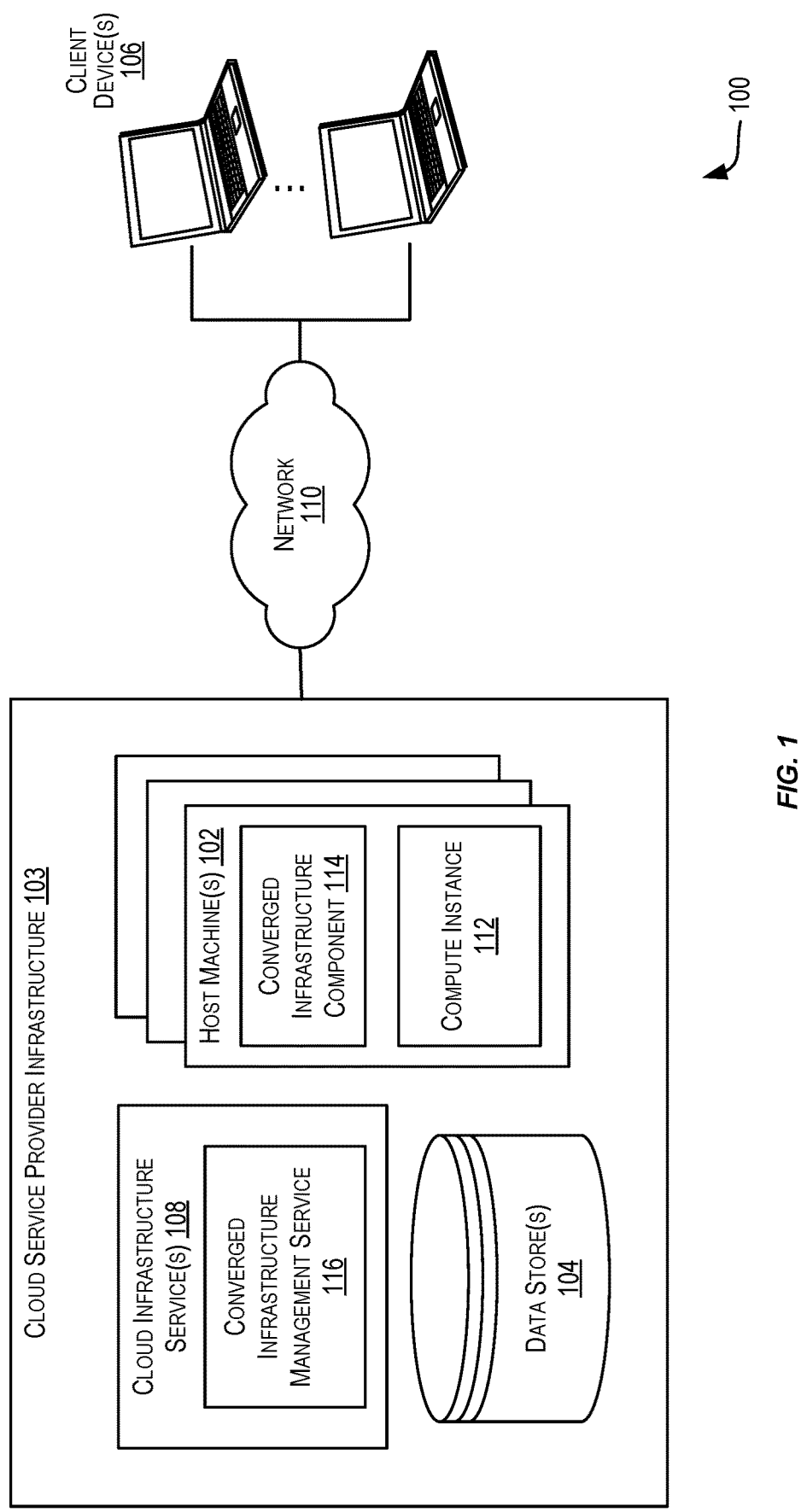
FIG. 1 is a block diagram illustrating a cloud computing environment for implementing the present disclosure, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for providing, configuring, and monitoring a converged network adaptor. Infrastructure as a Service (IaaS) is a cloud computing service model through which computing resources are hosted in a public, private, or hybrid cloud to be accessed and utilized by various users. There are many different implementations of hardware that can be used to provide IaaS. For example, a combination of dedicated servers, virtual servers, and bare metal servers can be used to provide IaaS.

Bare metal servers are often a desirable implementation that provides servers that are configured as single-tenant machines that deliver hardware with complete user access to storage, networking, etc. The access is made possible because bare metal servers do not rely on a hypervisor layer to create separate virtual machines (VMs). The bare metal servers eliminate the need for virtual layers by allowing users to install their preferred operating system directly on the bare metal server. Bare metal servers typically provide configurations with leading edge hardware, including but not limited to the newest generation processors, memory, storage devices, etc., with high-speed performance access. Bare metal servers also enable a user to configure the server hardware (e.g., processor, storage, memory, etc.) to their preferences because it is not shared with other users. Users can also implement any combination of software on the dedicated servers such as operation systems, applications, tools, etc.

In cloud computing environment in which tenants utilize a network to access computing resources and hardware managed by a cloud provider, it may be desirable to configure layers of network abstractions to ensure that network traffic of one tenant is isolated from network traffic of another. Overlay networks may be used to provide this encapsulation to differentiate network traffic associated with different tenants. A virtual or overlay network can also be referred to as a "virtual cloud network." Virtual networks can be implemented using software virtualization technologies (e.g., hypervisors, virtualization functions implemented by network virtualization devices (NVDs) (e.g., smart adaptors, smart NICs that implement one or more functions performed by an NVD), top-of-rack (TOR) switches, smart TORs that implement one or more functions performed by an NVD, and other mechanisms) to create layers of network abstraction that can be run on top of the physical network. In some embodiments, an NVD may be implemented as a network interface card (e.g., a "smart NIC" or "intelligent NIC") that includes an onboard embedded processor.

Conventional smart NICs were provided as a separate device, different from an off-the-rack network interface card (a "host NIC") that performs traditional network interface card functionality. A "smart adaptor," as used herein, refers to device that may be used to implement the functionality of a smart NIC and/or may be configured to provide other virtual resources such as virtual storage, cryptographic operations, and the like (e.g., one or more functions performed by an NVD). Any reference to a "smart adaptor" herein may be equally applied to a smart NIC. A smart NIC or smart adaptor may include one or more processing units (e.g., CPUs, Network Processing Units (NPUs), FPGAs, packet processing pipelines, etc.), memory including cache, and ports. The various virtualization functions may be performed by software/firmware executed by the one or more processing units of the smart NIC/adaptor. Providing these two network interface devices (e.g., 1) a smart NIC and/or smart adaptor and 2) a host NIC) as separate devices in the host machine wastes physical space and computing resources of the host machine and draws additional power from the host machine unnecessarily. The disclosed techniques are directed to combining the functionality of a smart NIC and/or a smart adaptor and a host NIC on a network interface card, hereinafter referred to as a "converged network adaptor."

This shared infrastructure introduces risk that a failure of the smart adaptor (e.g., the smart NIC portion of a smart adaptor) destabilizes the customer's workload in a manner that was not previously possible. As converged network adaptors are added or updated within host machines running bare metal instances, there is a risk that the converged network adaptor and/or updated software may not operate or operate as intended with the host OS. If the smart adaptor fails, the guest-visible devices may also fail and the compute instance OS (e.g., the bare metal instance OS) may hang or crash. This disclosure addresses, in part, providing, testing, and configuring these converged network adaptors for use in a specific bare-metal instance. In some embodiments, bare-metal images may be discovered and booted into an isolated host machine configured with a converged network adaptor. The images may individually be tested to detect failures between the converged network adaptor and the bare-metal OS of the image. Once an image has been identified as being stable or unstable with the converged network adaptor, the image may be marked as such. Unstable images may be restricted from being deployed/placed at host machines that are configured with the converged network adaptor. This may reduce the risk of failures occurring between the converged network adaptor and corresponding bare-metal instance OS.

A number of techniques may be employed to monitor aspects of host machines that are configured with a converged network adaptor. In some embodiments, a monitoring manager may be configured to obtain operational data corresponding to the physical state of the host machine. In some embodiments, the operational data may be obtained from a specialized service processor that monitors the physical state of the host machine such as an Integrated Lights Out Manager (ILOM) or other Baseboard Management Controller (BMC). In some embodiments, an agent executing on the OS of the bare-metal instance may be configured to transmit OS specific operational data that is visible to the OS to the monitoring manager for further processing. The monitoring manager may be configured to employ a machine-learning model that is trained utilizing supervised learning and a training data set for which such operational data is mapped to known failures. At run-time, current operational data may be provided to the model as input to determine a likelihood that a failure is occurring and/or likely to occur. The monitoring manager can execute a variety of operations to perform remedial actions to recover from the detected failures. Using the disclosed techniques, the risk of failures occurring between these converged network adaptors and the host OSs may be reduced and/or detected and recovery operations may be automatically performed to resolve such failures.

These techniques improve the operation of the Infrastructure as a Service (IaaS) platform, by reducing or eliminating failures due to the replacement and/or malfunction of hardware elements (e.g., converged network adaptors). The present disclosure discusses example implementations and embodiments related to IaaS using a bare metal system; however, it could be implemented in any combination of systems.

Moving on to FIG. 1, which illustrates a block diagram illustrating a cloud computing environment 100 for implementing the present disclosure, according to at least one embodiment. In some embodiments, the cloud computing environment 100 includes any suitable number of one or more host machines (e.g., host machine(s) 102) and one or more data store(s) 104 for providing, to one or more client device(s) 106 access to cloud service provider infrastructure (CSPI) 103 via a public network (e.g., network 110, the Internet). The CSPI 103 may be an Infrastructure As-A-Service (IaaS) platform having a combination of hardware and software configured to carry out aspects of the present disclosure. Each of the host machine(s) 102 may execute one or more virtualized components. By way of example, each of the host machine(s) 102 may correspond to a physical device on which various compute instances (e.g., compute instance 112) may be hosted. Compute instance 112 is intended to be an example of a virtual machine instance and/or bare metal instance. When the compute instance 112 is a bare metal instance, a single tenant (e.g., a tenant associated with client device(s) 106) may control the physical CPU, memory, and network interfaces of the host machine(s) 102 that host the bare metal instance. A bare metal compute instance may not be shared with other tenants of the cloud computing environment 100. A bare metal compute instance may enable users to load configurations (e.g., images) that execute instructions directly on logic hardware of the corresponding host machine without an intervening operating system.

An image is a template of a hard drive and determines the operating system and other software for an instance. The images can be standard images or custom images, which can be used to launch other instances and specify when to launch those instances. Users can create instances as needed to meet their compute and application requirements and the infrastructure configurations (or shapes) of the hardware running the images, for example, on the host machine(s) 102. After an instance is created, the user can access the instance securely from their client device(s) 106, restart it, attach and detach volumes, and terminate it when done with it.

One or more of the host machine(s) 102 may execute a hypervisor (not depicted) that creates and enables a virtualized environment. One or more compute instances may be created, executed, and managed by a hypervisor on that host machine. The hypervisor on a host machine enables the physical computing resources of the host machine (e.g., compute, memory, and networking resources) to be shared between the compute instances executed by the host machine.

In some embodiments, the cloud computing environment 100 can include or otherwise be communicatively attached to one or more data stores (e.g., data store(s) 104) that may include any suitable combination of computing devices configured to store and organize a collection of data. In some embodiments, the data store(s) 104) may store images (and data related thereto) that have been registered for use within the cloud computing environment 100.

At least some of these host machine(s) 102 may be configured with converged infrastructure component 114. Converged infrastructure component 114 is an example of a physical hardware component that is configured with any combination of hardware, software, and firmware that combines functionality of multiple physical components into a single, physical component. Any suitable combination of hardware, software, and firmware can be combined into a converged infrastructure. By way of example, converged infrastructure component 114 may be an example of a converged network interface card (also referred to as a "converged network adaptor"). The converged infrastructure component 114 can include firmware and/or software associated with a host network interface card (e.g., a conventional network interface card installed at a host machine) and a smart adaptor (e.g., that may implement functions of a smart network interface controller (NIC) and/or network virtualization device (NVD)). The converged infrastructure component 114 may include one or more processing units (e.g., CPUs, Network Processing Units (NPUs), FPGAs, packet processing pipelines, etc.), memory including cache, and ports. The various virtualization functions may be performed by software/firmware executed by the one or more processing units of the converged infrastructure component 114.

Converged infrastructure component 114 may be configured with a software agent (not depicted) that enables the converged infrastructure component 114 to provide additional functionality associated with non-networking components. By way of example, the agent can be used to provide non-volatile memory, a security module (e.g., trusted platform module (TPM) configured to execute cryptographic operations on data, and the like. To ensure that tenants do not modify the functionality (e.g., networking and/or non-networking-based functionality) of the converged infrastructure component 114 may be hidden from the operating system (OS) of the compute instance 112. The host NIC portion of the converged infrastructure component 114 may remain visible to the OS.

At least one of the cloud infrastructure service(s) 108 may include converged infrastructure management service 116. Converged infrastructure management service 116 may be configured to manage configuration, updates, and failure monitoring and recovery with respect to any suitable number of converged infrastructure components (e.g., converged infrastructure component 114). The specific operations performed by the converged infrastructure management service 116 are discussed in more detail with respect to FIGS. 4-8.

Figure 2:
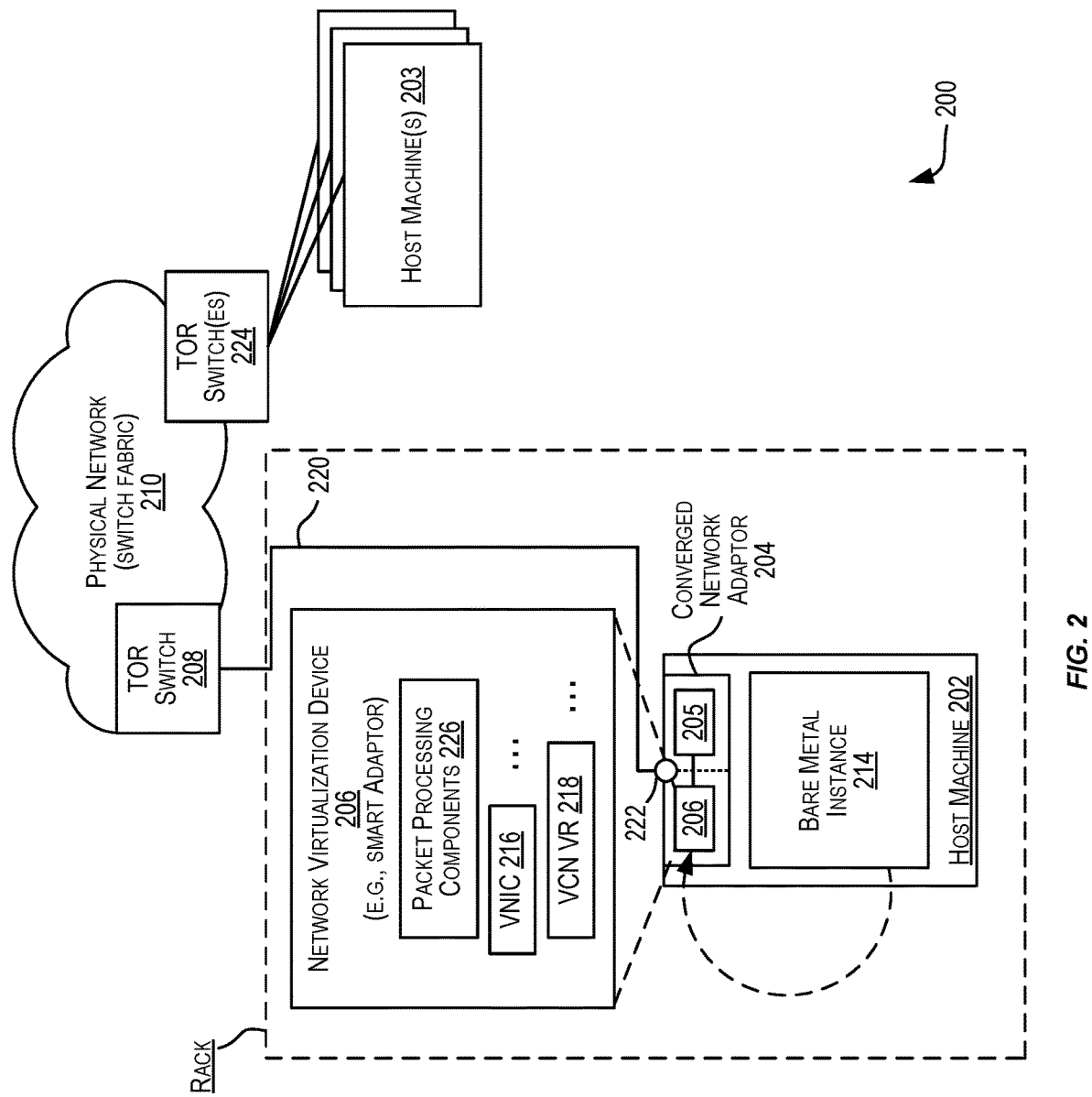
FIG. 2 depicts a block diagram illustrating an example architectural of physical components of a host machine of the cloud-computing environment, the physical components including a converged network adaptor, according to at least one embodiment.

FIG. 2 depicts a block diagram illustrating an example architectural 200 of physical components of a host machine 202 of the cloud computing environment 100 of FIG. 1. The host machine 202 may be an example of the host machine(s) 102 of FIG. 1. In some embodiments, the physical components of host machine 202 include converged network adaptor 204 (e.g., the converged infrastructure component 114 of FIG. 1) according to at least one embodiment.

In some embodiments, converged network adaptor 204 may include host NIC 25 and network virtualization device (NVD) 206 (e.g., a smart adaptor). In some embodiments, NVD 206 may provide the underlay for a virtual network. As shown, architecture 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of host machine 202 are provisioned for the customer. Customers can then build their own cloud-based (i.e., CSPI-hosted) customizable and private virtual networks using physical compute, memory, and networking resources. As previously indicated, these customer networks are referred to as virtual cloud networks (VCNs). A customer can deploy one or more customer resources, such as compute instances, on these customer VCNs. Compute instances can be in the form of virtual machines, bare metal instances (as depicted), and the like. The CSP provides infrastructure (e.g., the components of host machine 202) and a set of complementary cloud services that enable customers to build and run a wide range of applications and services in a highly available hosted environment.

In the example embodiment depicted in FIG. 2, the physical components of the cloud service provider infrastructure (CSPI) include one or more physical host machines or physical servers (e.g., host machine 202, host machine(s) 203), network virtualization devices (NVDs) (e.g., NVD 206), top-of-rack (TOR) switches (e.g., TOR switch 208), and a physical network (e.g., physical network 210 and its corresponding switch fabric). The physical host machines or servers (e.g., host machine 202, host machine(s) 203) may host and execute various compute instances that participate in one or more subnets of a VCN. The compute instances may include virtual machine instances and bare metal instances. By way of example, bare metal instance 212 may participate in one or more subnets of a VCN (not depicted).

At least some of the host machines of FIG. 2 may include bare metal servers that host bare metal compute instances (e.g., bare metal instance 214). When a bare metal compute instance is provisioned, a single customer or tenant maintains control of the physical CPU, memory, and network interfaces of the host machine hosting the bare metal instance and the host machine is not shared with other customers or tenants. Other host machines (e.g., host machine(s) 203) may execute a hypervisor that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

Typically, a hypervisor is a software layer that sits between operating systems on a physical server and the hardware components of the server, mediating access to computing resources to cause each OS on the hardware to use only it's authorized share of computing resources. The hypervisor provides a virtualized environment by enabling the physical computing resources (e.g., processing resources such as processors/cores, memory resources, networking resources) of the host machine to be shared among the various virtual machine compute instances executed by the host machine. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The hypervisor may be observable and operable from the host OS(s).

Each compute instance that is part of a VCN may be associated with a virtual network interface card (VNIC) that enables a compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a bare metal instance 214 that is associated with VNIC 216, and VNIC 216 is executed by NVD 206 as part of host machine 202. In some embodiments, the bare metal instance 214 may be associated with any suitable number of VNICs (e.g., two or more) which are individually executed by NVD 206. The converged network adaptor 204 may include packet processing components 226 that may include any suitable logic for processing packets to and/or from the host machine 202.

For compute instances hosted by a host machine, an NVD connected to that host machine also executes VCN VRs corresponding to VCNs of which the compute instances are members. For example, in the embodiment depicted in FIG. 2, NVD 206 executes VCN VR 218 corresponding to the VCN of which bare metal instance 214 is a member.

A host machine (e.g., host machine 202) may include one or more network interface cards (NIC) (e.g., converged network adaptor 204) that enables the host machine to be connected to other devices. A converged network adaptor on a host machine may provide one or more ports (or interfaces) that enable the host machine to be communicatively connected to another device. For example, host machine 202 may be connected to other host machine(s) 203 and/or TOR switch 208 via one or more of these ports.

For example, in FIG. 2, host machine 202 is connected to TOR switch 208 using a link 220 that extends between a port 222 provided by the converged network adaptor 204 of host machine 202. TOR switch 208 may be connected to physical network 210 (also referred to as the switch fabric). In certain embodiments, the links between a converged network adaptor 204 and a TOR switch (e.g., TOR switch 208) are Ethernet links. For example, in FIG. 2, the links 220 is an Ethernet link. The collection of host machines and converged network adaptor 204 that are connected to a TOR is sometimes referred to as a rack.

Physical network 210 provides a communication fabric that enables TOR switches to communicate with each other. Physical network 210 can be a multi-tiered network. In certain implementations, physical network 210 is a multi-tiered Clos network of switches, with TOR switches 208 and 224 representing the leaf level nodes of the multi-tiered and multi-node physical switching network. Different Clos network configurations are possible including but not limited to a 2-tier network, a 3-tier network, a 4-tier network, a 5-tier network, and in general a "n"-tiered network.

In some embodiments, any suitable number of the host machine(s) 203 may utilize network virtualization devices that are separate from the host NIC executing at the host machine(s) 203. In these examples, the host NIC of the host machine may be connected via a link (e.g., an Ethernet link) between a port of the host NIC and a port of the corresponding NVD. The corresponding NVD may then be connected to one of the TOR switches 224 via another link (e.g., Ethernet link) between a port of the NVD and a port of the TOR switch.

Various different connection configurations are possible between host machines and NVDs such as one-to-one configuration, many-to-one configuration, one-to-many configuration, and others. In a one-to-one configuration implementation, each host machine is connected to its own separate NVD or includes a converged network adaptor in which host NIC and smart adaptor functionality are provided. In a many-to-one configuration, multiple host machines are connected to one NVD (e.g., a separate NVD, not depicted). For example, multiple of the host machine(s) 203 may be connected to the common NVD via respective host NICs.

Unlike a host NIC, a smart adaptor (e.g., NVD 206) may be configured with a software agent that enables the smart adaptor to provide additional functionality associated with non-networking components. By way of example, the smart adaptor agent can be used to provide non-volatile memory, a security module (e.g., trusted platform module (TPM) configured to execute cryptographic operations on data, and the like. To ensure that tenants cannot modify the functionality (e.g., networking and/or non-networking-based functionality), NVD 206 (e.g., a smart adaptor) may be managed by the CSP and may not be visible to the operating system (OS) of the compute instance of the host machine. Host NIC 205 may be visible to the OS of the host machine. In some embodiments, the converged network adaptor 204 may be partitioned such that the portion on which the NVD 206 executes is not visible to the OS, while the portion on which the host NIC 205 executes remains visible. The disclosed converged network adaptor 204 may utilize a Peripheral Component Interconnect (PCI) card of the smart adaptor that is configured to execute the functionality typically provided by a separate host NIC.

The NVD 206 may receive packets and frames from a host machine (e.g., packets and frames generated by a compute instance hosted by the host machine) via a connection (e.g., peripheral component interconnect express (PCIe)) with host NIC 205. After performing the necessary packet processing (e.g., using logic of packet processing components 226), the NVD 206 may forward the packets and frames to TOR switch 208 via a network-facing port of the NVD. NVD 206 may receive packets and frames from TOR switch 208 via a network-facing port of the NVD and, after performing the necessary packet processing (e.g., using packet processing components 226), may forward the packets and frames to a host machine via host NIC 205 and a host facing port of the NVD 206.

NVD 206 implements or performs network virtualization functions. These functions are performed by software/firmware executed by the NVD 206. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, NVD 206 is configured to execute functionality of the packet processing components 226 for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in the NVD 206 may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD 206. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 9, 10, 11, and 12 (see references 916, 1016, 1116, and 1216) and described below. Examples of a VCN Data Plane are depicted in FIGS. 9, 10, 11, and 12 (see references 918, 1018, 1118, and 1218) and described below. The control plane functions include functions used for configuring a network (e.g., setting up routes and route tables, configuring VNICs, etc.) that controls how data is to be forwarded.

As indicated above, an NVD executes various virtualization functions including VNICs and VCN VRs. An NVD may execute VNICs associated with the compute instances hosted by one or more host machines connected to the VNIC. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 22, NVD 206 executes VCN VR 218 corresponding to the VCN to which bare metal instance 214 belongs. If a host machine hosts compute instances belonging to different VCNs, the NVD operating at (or connected to) that host machine may execute VCN VRs corresponding to those different VCNs.

In addition to VNICs and VCN VRs, an NVD 206 may execute various software (e.g., daemons) and include one or more hardware components that facilitate the various network virtualization functions performed by the NVD. For purposes of simplicity, these various components are grouped together as "packet processing components" shown in FIG. 2. For example, NVD 206 comprises packet processing components 226. For example, the packet processing components for an NVD may include a packet processor that is configured to interact with the converged network adaptor 204 ports and hardware interfaces to monitor all packets received by and communicated using the NVD 206 and store network information. The network information may, for example, include network flow information identifying different network flows handled by the NVD 206 and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD 206 to one or more different replication target stores. As yet another example, the packet processing components may include a logging agent that is configured to perform logging functions for the NVD 206. The packet processing components may also include software for monitoring the performance and health of the NVD 206 and, also possibly of monitoring the state and health of other components connected to the NVD 206.

In some embodiments, a compute instance in a customer VCN (e.g., bare metal instance 214) may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances (e.g., VNIC 216), the VCN VRs (VCN VR 218), and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing component, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing component, which can include execution of one or more VNICs, and the VR associated with the VCN. For example, as part of the packet processing component, the NVD (e.g., NVD 206) executes or invokes functionality corresponding to the VNIC 216 (also referred to as executes the VNIC) associated with source compute instance. The functionality performed by the VNIC may include looking at the VLAN tag on the packet. Since the packet's destination is outside the subnet, the VCN VR 218 functionality is next invoked and executed by the NVD 206. The VCN VR 218 then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within a customer's on-premise network, then the packet may be forwarded by the VCN VR to the NVD executing a gateway configured for the VCN. The VCN VR may be executed on the same NVD as the NVD executing the VNIC associated with the source compute instance or by a different NVD. The gateway may be executed by an NVD, which may be a smart NIC or adaptor, a host machine, a converged network adaptor, or other NVD implementation. The packet is then processed by the gateway and forwarded to a next hop that facilitates communication of the packet to its intended destination endpoint. For example, in the embodiment depicted in FIG. 2, a packet originating from bare metal instance 214 may be communicated from host machine 202 to NVD 206 via host NIC 205. NVD 206 may invoke VNIC 216. VNIC 216 may be configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI and endpoints outside. Endpoints hosted by CSPI may include instances in the same VCN or other VCNs, which may be the customer's VCNs, or VCNs not belonging to the customer. Communications between endpoints hosted by CSPI may be performed over physical network 210. A compute instance may also communicate with endpoints that are not hosted by CSPI or are outside CSPI. Examples of these endpoints include endpoints within a customer's on-premise network or data center, or public endpoints accessible over a public network such as the Internet. Communications with endpoints outside CSPI may be performed over public networks (e.g., the Internet) (not shown in FIG. 2) or private networks (not shown in FIG. 2) using various communication protocols.

Figure 3A:
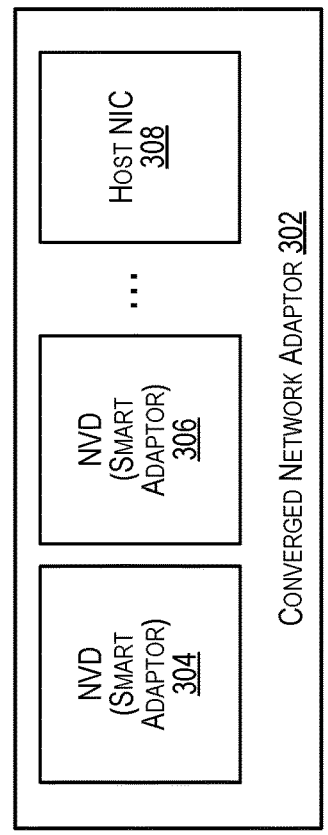
FIGS. 3A and 3B illustrate two additional example configurations of a converged network adaptor, according to at least one embodiment.
Figure 3B:
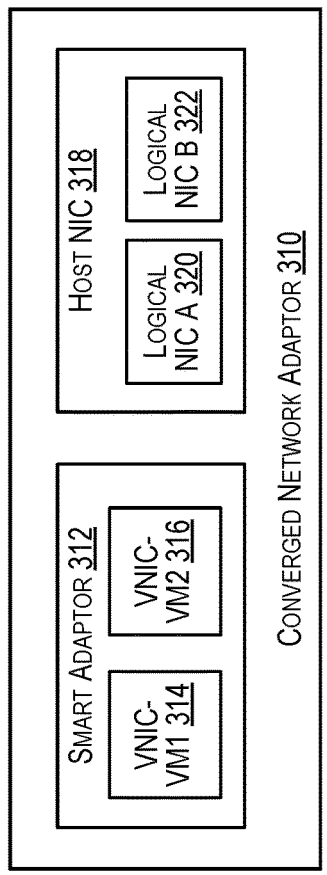

FIGS. 3A and 3B illustrate two additional example configurations of a converged network adaptor (e.g., converged network adaptor 302), according to at least one embodiment. Converged network adaptor 302 may include any suitable number of NVDs (e.g., NVD 304, NVD 306, each an example of the NVD 206 of FIG. 2) and a host NIC (e.g., host NIC 308, an example of the host NIC 205 of FIG. 2).

The arrangement depicted in FIG. 3A provides two separate physical network paths to and from physical switch network (e.g., physical network 210) to host machine on which converged network adaptor 302 operates: a first path traversing host NIC 308, NVD 304, to a TOR switch (e.g., TOR switch 208), and a second path traversing host NIC 308, NVD 304, to the same or different TOR switch. The separate paths provide for enhanced availability (referred to as high availability) of the host machine on which converged network adaptor 302 operates. If there are problems in one of the paths (e.g., a link in one of the paths goes down) or devices (e.g., a particular NVD is not functioning), then the other path may be used for communications to/from the host machine. In some embodiments, a host machine may include the functionality of multiple NICs executing at the converged network adaptor 302.

FIG. 3B depicts another example configuration of a converged network adaptor 310 (e.g., an example of the converged network adaptor 204 of FIG. 2) providing connectivity between a host machine and an NVD (e.g., smart adaptor 312) for providing I/O virtualization for supporting multitenancy according to certain embodiments. As depicted in FIG. 3B, the host machine on which converged network adaptor 204 executes may execute a hypervisor that provides a virtualized environment. The host machine may further execute two virtual machine instances (not depicted). One VM instance ("VM1") may belong to customer/tenant #1 and the other VM instance ("VM2") may belong to customer/tenant #2. VM1 and VM2 may be attached to a corresponding VNIC. Each of the compute instances is attached to a VNIC that is executed by a NVD (e.g., smart adaptor 312). In the embodiment in FIG. 3B, VM1 may be attached to VNIC-VM1 314 and VM2 may be attached to VNIC-VM2 316.

As shown in FIG. 3B, host NIC 318 comprises two logical NICs, logical NIC A 320 and logical NIC B 322. Each virtual machine is attached to and configured to work with its own logical NIC. For example, VM1 &406 is attached to logical NIC A 320 and VM2 &408 is attached to logical NIC B 322. Even though host machine &402 comprises only one physical NIC &410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 320 for Tenant #1 and a separate VLAN ID is assigned to logical NIC B 322 for Tenant #2. When a packet is communicated from VM1, a tag assigned to Tenant #1 is attached to the packet by the hypervisor and the packet is then communicated from host machine to the NVD (e.g., smart adaptor 312). In a similar manner, when a packet is communicated from VM2, a tag assigned to Tenant #2 is attached to the packet by the hypervisor and the packet is then communicated from host machine to smart adaptor 312. Accordingly, a packet communicated from host machine to NVD 312 has an associated tag that identifies a specific tenant and associated VM. On the NVD, for a packet received from host NIC 318, the tag associated with the packet is used to determine whether the packet is to be processed by VNIC-VM1 314 or by VNIC-VM2 316. The packet is then processed by the corresponding VNIC. The configuration depicted in FIG. 3B enables each tenant's compute instance to believe that they own their own host machine and NIC. The setup depicted in FIG. 3B provides for I/O virtualization for supporting multi-tenancy.

Examples of Converged Infrastructure Management

Figure 4:
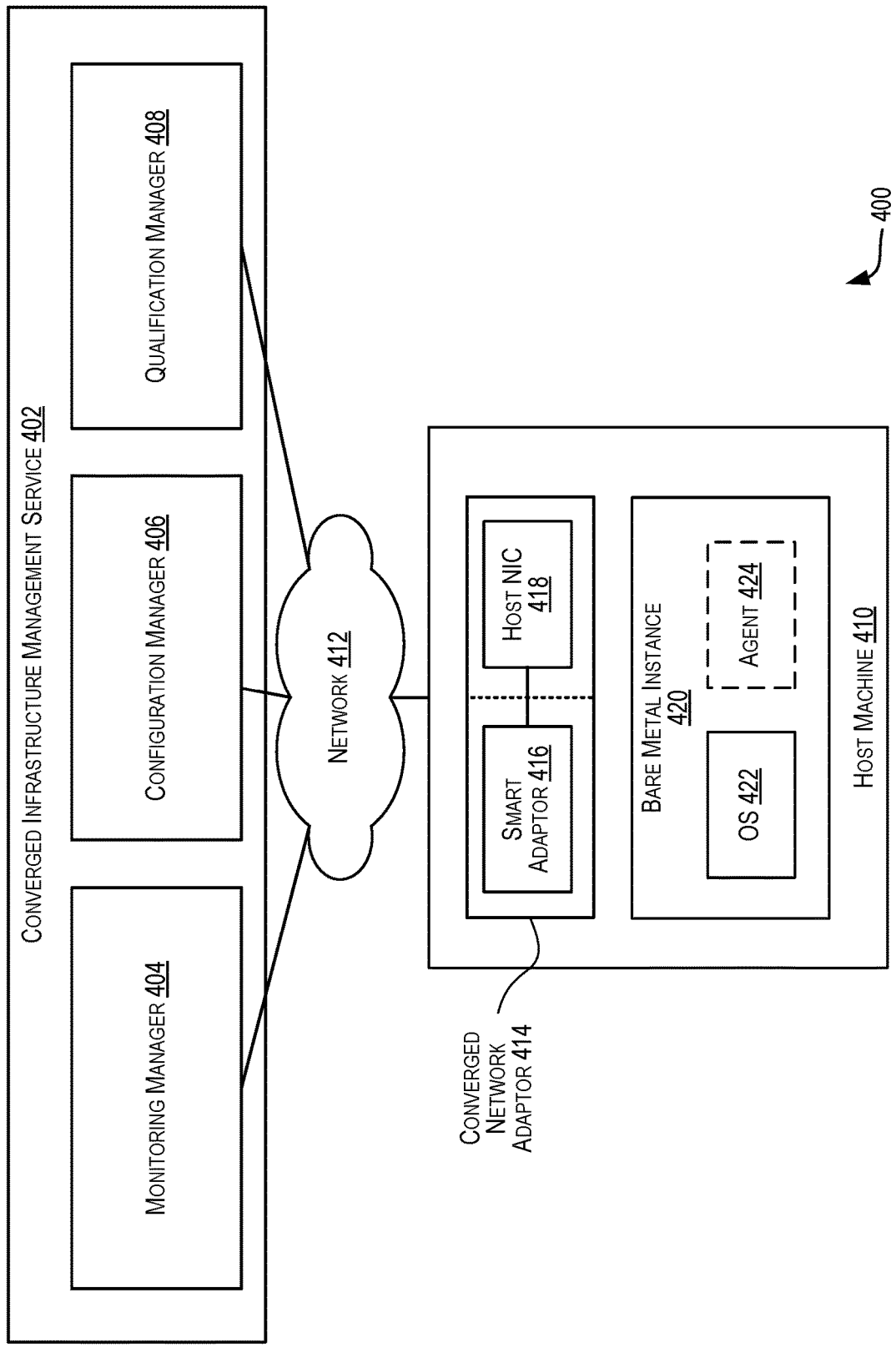
FIG. 4 illustrates a block diagram representing example components of a converged infrastructure management service, according to at least one embodiment.

FIG. 4 illustrates a block diagram 400 representing example components of a converged infrastructure management service 402 (e.g., an example of the converged infrastructure management service 116 of FIG. 1), according to at least one embodiment. Converged infrastructure management service 402 may be configured to manage configuration, updates, and failure monitoring and recovery with respect to any suitable number of converged infrastructure components (e.g., converged infrastructure component 114).

As depicted, converged infrastructure management service 402 may include monitoring manager 404, configuration manager 406, and qualification manager 408, although any suitable number of computing modules and/or services may be utilized. Some of the functionality of the components 404-408 may be combined in any suitable manner or distributed across various other components (not depicted). The components 404-408 may be connected with host machine 410 (e.g., an example of the host machine 202 of FIG. 2, one of the host machine(s) 102 of FIG. 1) via network 412 (e.g., an example of the network 110 of FIG. 1, an example of physical network 210 of FIG. 2).

The host machine 410 may operate a converged network adaptor 414 (e.g., an example of the converged infrastructure component 114 of FIG. 1, converged network adaptor 204 of FIG. 2, converged network adaptor 302 of FIG. 3A, converged network adaptor 310 of FIG. 3B, etc.). Converged network adaptor 414 may include smart adaptor 416 and host NIC 418 which may provide the networking functionality described in connection with FIG. 2 for host machine 410. In some embodiments, smart adaptor 416 may provide additional non-networking functionality (e.g., cryptographic operations, storage, etc.) as discussed above in connection with FIG. 2.

Host machine 410 may host bare metal instance 420 (e.g., an example of the bare metal instance 214 of FIG. 2, an example of the compute instance 112 of FIG. 1). Bare metal instance 420 may include OS 422. In some embodiments, bare metal instance 420 may execute an agent (e.g., agent 424) for additional functionality described in more detail with respect to FIG. 6.

Converged infrastructure management service 402 may include qualification manager 408. Qualification manager 408 may be configured to qualify one or more images as being compatible/incompatible with the converged network adaptor 414.

Figure 5:
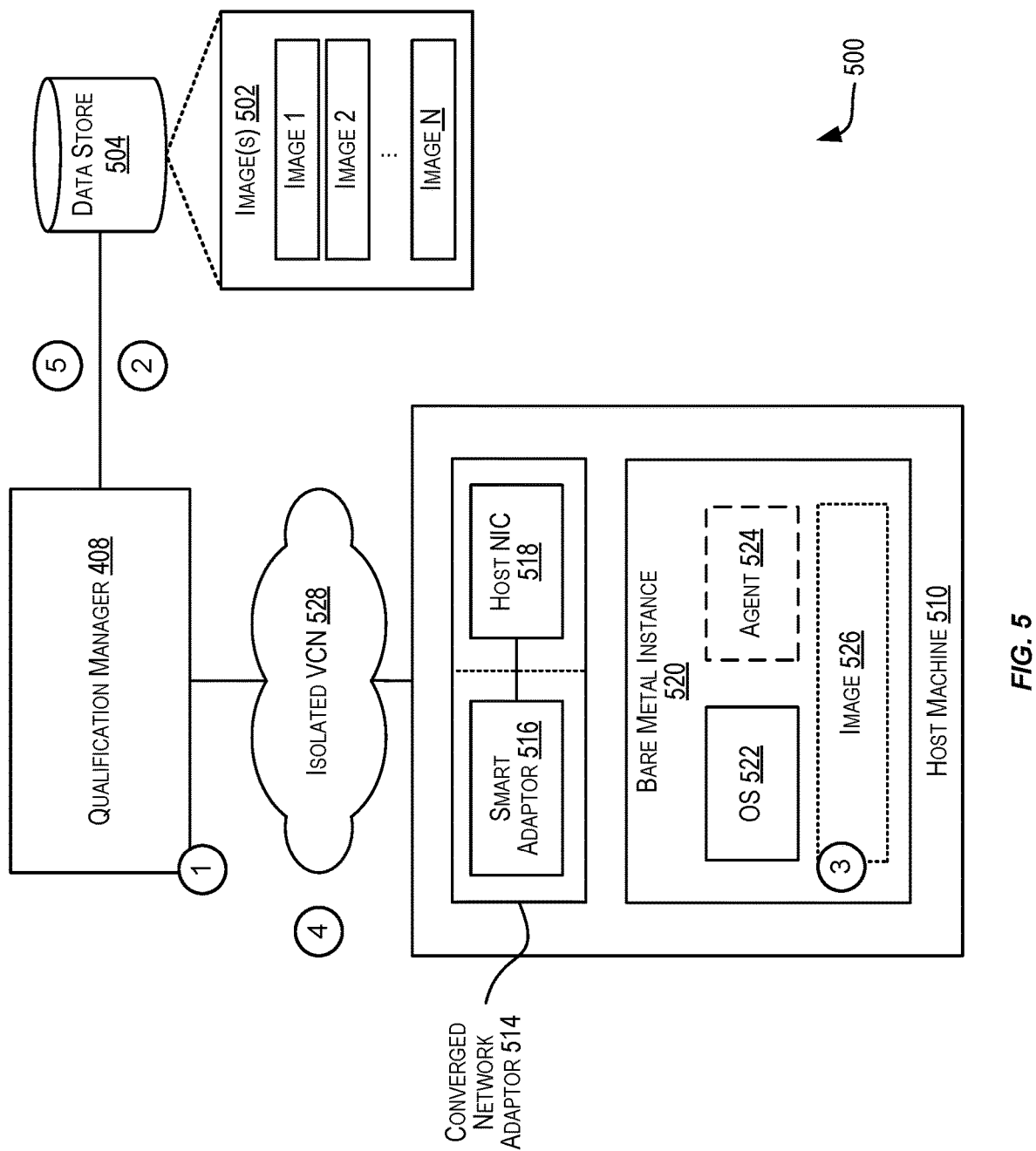
FIG. 5 is a block diagram illustrating an example method for qualifying one or more images as being compatible with a converged network adaptor, according to at least one embodiment.

FIG. 5 is a block diagram illustrating an example method 500 for qualifying one or more images (e.g., image(s) 502) as being compatible with a converged network adaptor (e.g., converged network adaptor 514, an example of the converged network adaptor 414 of FIG. 4), according to at least one embodiment. The method 500 may be performed by the qualification manager 408. Image(s) 502 may include any suitable number of images (e.g., image 1-N) that may be used with compute instances (e.g., bare metal instance 420 of FIG. 4).

The qualification manager 408 may execute the operations of method 500 to perform auto-qualification of images for any new hardware configurations or shapes that may be added or transitioned to within an IaaS. The process provides steps to reduce or eliminate the likelihood that a customer (e.g., user) will experience a hard hang/crash due to infrastructure (e.g., converged infrastructure) misbehavior when the customer's image is transitioned to a new hardware shape.

Initially, a user can coordinate an IaaS with the bare metal instance 420 of FIG. 4, for example. As part of the IaaS on the bare metal instance 420, the user can provide (e.g., via client device(s) 106 of FIG. 1), one or more images to be run on the infrastructure provided by bare metal instance 420 (e.g., image 526). The image 526 can be customized to the hardware elements provided within the host machine 410 of FIG. 4. In some embodiments, the host machine 410 can include converged infrastructure, for example, a converge network adaptor 414 as depicted in FIG. 4. As part of the customization, the user can perform lengthy testing and tweaking to the image to ensure that it operates in a stabilized manner. Thereafter, the user can access an instance of the image running on the bare metal instance 420 in any manner that the user desires.

At step 1, qualification manager 408 may initiate an auto-qualification process. This process may be initiated at any suitable time, according to a predefined schedule or periodicity, or the like. The auto-qualification can include pre-testing and pre-certifying customer images (e.g., image(s) 502) for use with new hardware prior to the new hardware being implemented. The auto-qualification process can be initiated in response to any combination of triggering events. For example, whenever an administrator of an IaaS introduces new servers, hardware configurations, shapes, etc. somewhere within the bare metal instance 420.

The introduction of a new servers, hardware configurations, shapes, etc. can include introduction of a new infrastructure combination that has not been part of the system previously. For example, introduction of a new converged network adaptors that is different from other converged network adaptors, or converged network adaptors that are already part of the system (e.g., converged network adaptor 514). The introduction of new infrastructure can also include introduction of a new combination of components that may operate differently than on previously existing infrastructure combinations. For example, a converged network adaptor could have been previously introduced on a server with an Intel processor, but a new configuration could be the same converged network adaptor introduced on a server with an AMD processor. Similarly, if an infrastructure was previously introduced and pre-qualified, it may not trigger the qualification manager 408 if the same infrastructure is introduced, even if it is new to the system. For example, if a particular server/host machine with a particular infrastructure combination was previously qualified, adding a new server/host machine with the same particular infrastructure would not need to be pre-qualified. In some embodiments, the new servers, hardware configurations, shapes, etc. can be installed but not enabled to be accessed by user images until after the auto-qualification process has been completed.

At step 2, all the image(s) 502 previously registered are discovered. The image(s) 502 can be discovered using any combination of methods. For example, the qualification manager 408 can crawl through a variety of data stores (including data store 504 at which image(s) 502 are stored) for all images ever registered (e.g., images that have been registered with a bare metal instance). The image(s) 502 can be registered with an image service (not depicted) and the crawling can be through a listing all images for different regions. In some embodiments, the data store 504 may be managed by the image service. In some embodiments, an instance of the qualification manager 408 can exist in each region where an image service exists. With an qualification manager 408 instance in each region, separate API calls can be made to the image service in each region to retrieve the list of all images to test in that region. If there is only one global qualification manager 408, then this service may need to go through the list of all regions, and for each region, request the list of all registered images in that region from the corresponding image service, and then run an auto-qualification workflow on a compute instance of each image aggregated from the various per-region image service endpoints.

In some embodiments, the identified image(s) (e.g., image(s) 502) can be aggregated in a list for testing and sorted based on frequency of usage. The image(s) 502 can include a combination of images uploaded by customer users or present images configured and uploaded by the system administrator for the bare metal instance 420. For example, users can upload images to an object store service and/or through an image registration service. In some embodiments, as part of the image registration, the image can include or be associated with an image key and a reference to a block to get an identifier. Upon registration, a user can grant the IaaS read access to fetch a binary large object (BLOB) for the image and place the image in storage. When registering a new image, the customer may give a loose indication of what type of server they are hoping to run on and/or test the image themselves. Initially, a customer may also select an "instance type" or "instance shape" which has an implied microarchitecture (e.g., x86_64, ARM64, etc.). In some embodiments, newly registered images can go through the pre-testing/pre-qualifying process as discussed in greater detail herein.

Continuing with step 2, as each of the image(s) 502 are discovered/identified, the images can be tagged or collected to be pre-tested/pre-qualified on an implementation of the new infrastructure. The pre-testing/pre-qualifying is performed to ensure that the image 526 (one of the image(s)

502), including operating system 522, operates with the new infrastructure configuration (e.g., the converged network adaptor 514) in a stable manner. In some embodiments, the qualification manager 408 can check that the owner/creator of the image 526 has granted permission to auto-qualify the image 526 prior to performing any testing. For example, the owner/creator may be given an option to opt into qualification management services to allow the system (e.g., the converged infrastructure management service 402 of FIG. 4, the qualification manager 408) to preemptively (e.g., each time new hardware configurations are proposed or added elsewhere in the IaaS) auto-qualify their images. If the image 526 does not enable permission for auto-qualification the image 526 can be added to an unqualified list or the blacklist. Blacklisting is to prevent attempts to spin-up compute instances from images known to not work on a specific server configuration (e.g., a configuration of host machine 510). An image may be either known-bad, unknown or known-good. Known-bad images get blacklisted and are thereafter restricted from being paired/deployed/installed at a host machine/server with with a configuration that is known to be problematic (e.g., a host machine with a converged network adaptor such as converged network adaptor 514). Known-good server-image pairings may always get used. Unknown server-image pairings may continue to carry the risk of potential instability until the customer tests them by booting them and seeing what happens (at which time the images will be tagged as known-good-due-to-customer-testing as opposed to known-good due to auto-qualification testing). Adding an image (e.g., image 526) to an unqualified list or blacklist can include notifying the user using the image that it is not enabled for pre-qualification, and it may result in unexpected downtime in the event that it needs to be loaded on a new infrastructure configuration in the future.

At step 3, each discovered image (e.g., image 526) is loaded, booted, spun up, etc. onto an instance of the new infrastructure (e.g., host machine 510 which includes coverged network adaptor 514) for pre-testing/pre-qualification. The pre-testing/pre-qualification is designed to determine whether the image 526 is stable to run on the new infrastructure. For example, when a new (e.g., converged network adaptor 514) is introduced to one or more of the servers (e.g., host machine 410 of FIG. 4), then a new infrastructure has been introduced and images may be loaded, booted, spun up, etc. thereon for pre-testing/pre-qualification. In some embodiments, pre-testing/pre-qualification can involve running an instance of an image 526 to see if observable behaviour of the instance on an older, previously approved server configuration is similar to the observable behaviour of an instance of that same image running on the newer infrastructure configuration. For instance, it may be common for compute instances to attempt to access a particular service (e.g., an Instance Metadata Service (IMDS), not depicted) on boot. Instances may usually fetch self-configuration data and intrinsic properties metadata from that service. Therefore, if an instance of the image 526 under test may be booted on an isolated server (e.g., host machine 510, configured to operate within an isolated VCN such as isolated VCN 528) while listening for it to attempt to contact the service (e.g., IMDS), it can be inferred that the OS 522 of the instance booted, networking was fully setup, and an agent inside the OS could successfully craft and send out requests for the instance's metadata. In this instance, the OS 522 may be identified as being able to boot and fetch instance metadata, and the test can be considered as passing. The image 526 could me marked as having passed the test. In some embodiments, the image 526 can be whitelisted (e.g., added to a list of known-good images) or otherwise labeled so that the image 526 may be potentially deployed/installed/executed at a host machine configured with a converged network adaptor similar to (e.g., having the same configuration as) converged network adaptor 514.

In some embodiments, each discovered image can be loaded, booted, spun up, etc. on one or more instances within isolated virtual cloud network (VCN), for example, on the host machine 510. The isolated VCN 528 (or other similar implementation) can be used such that the image(s) currently being used on other preexisting infrastructure is not impacted by the testing and errors or failures caused by the pre-testing/pre-qualification.

In some embodiments, at least a portion of the new infrastructure (specify specific server, rack, etc.) being introduced can be reserved for dedicated image testing. For example, if multiple new servers/host machines are introduced into the system (e.g., CSPI 103 of FIG. 1), then each of the new servers/host machines can be used for testing images. If new hardware infrastructure is introduced, it can be made available for use to customers once some percentage of the images passes testing on the new hardware. In some embodiments, each image can be booted into an isolated virtual cloud network (VCN) on a server that has the new hardware configurations/shapes installed (e.g., a new converged network adaptor). The use of VCN ensures that the image testing is not interfering with the other servers supporting the user's IaaS.

In some embodiments, the discovered image(s) 502 can be sequentially loaded and tested on a single setup (infrastructure configuration/VCN such as host machine 510 and isolated VCN 528) and/or they can be loaded and tested on multiple new infrastructures (VCN) of the same configuration. For example, each of the existing image(s) 502 can be booted onto host machine 510 having the converged network adaptor 514 (combined host NIC and smart adaptor on a common motherboard) to determine if the image(s) 502 are compatible with a converged network adaptor 514. In some embodiments, the qualification manager 408 can prioritize testing of the most frequently used images first, for example, based on usage statistics. In some embodiments, to preserve the customer images, the qualification manager 408 can register an independent copy of an image before attempting to do the auto-qualification. By creating a copy, the original version of the image is preserved while testing can be performed using the copy.

At step 4, the image(s) 502 are probed during the pre-testing/pre-qualification to see if the running instance of the image(s) 502 achieve full boot, connectivity and stability. For example, once an image (e.g., image 526) is booted on the isolated hardware of host machine 510, the qualification manager 408 (or VCN) can probe to see if the running instance achieves full boot, connectivity and stability without crashing or hanging up (e.g., kernel crash). In other words, the images can be loaded, booted, spun up, etc. to determine whether the image boots completely without having a kernel crash or other destabilizing effect. Based on the results of the probing, the image 526 can be marked as stable or unstable, depending how the image 526 performs on the new infrastructure configuration (i.e., converged network adaptor 514) on the isolated hardware. If the image 526 is unstable or fails to boot completely, the image 526 can be blacklisted so that the system prevents placement of instances of that image on the new infrastructure. If the image 526 is stable and boots completely, the image 526 can be approved for placement of instances of that image on the new infrastructure.

At step 5, images that are determined to be unstable and/or fail to boot completely, may be added to a blacklist stored in data store 504. In some embodiments, images that are determined to be stable and boot completely may be added to a whitelist stored in data store 504, or elsewhere. Images can be added to the blacklist/whitelist at the hardware/server configuration level or at a hardware component level (e.g., at the NIC or SSD level) with the result that any hardware configuration containing the new component should not accept a launch of the blacklisted image and/or images for a hardware configuration may be selected only from whitelisted images. When checking to determine whether an image is pre-qualified to run on a particular infrastructure configuration, the blacklist can be referenced. In some embodiments, blacklisted images also trigger a warning to the creator/owner of the image (e.g., in a console, in API responses, etc.) suggesting that the image is not fit for use on the new hardware shapes (e.g., servers using converged network adaptors such as converged network adaptor 514). In response to a warning and/or notification that an image is placed on a blacklist, the customer may be given an option to request an attempt to patch the image when a patching path exists. In some embodiments, copies of the blacklisted images can be made prior to performing any patching. After reviewing the registered images and/or making copies of the incompatible registered images, the qualification manager 408 can attempt to patch the incompatible image.

By way of example, if a patching option exists, an incompatible image is automatically patched to be compatible with the new infrastructure. The determination that an image can be patched can be performed using any combination of techniques, for example, by comparing similar images to one another. If an incompatible image is successfully patched, it can be removed from the blacklist of data store 504 and approved for use on the new infrastructure. In some embodiments, the original image remains on the blacklist, while a patched copy is registered as a new image and is added to a whitelist. A user trying to create a new instance from the old image may receive a message asking them to use the replacement patched image instead. If no patching option exists, the incompatible image can remain blacklisted.

In some embodiments, an unqualified image can be compared against all or parts the images in the database, including all registered images, all image patches/updates, and a historical record of how images have been patched and/or what changes were made to patch images. The comparisons can include comparing listings of all installed software, version info, checksums for key files, etc. with known listings to see if any match (excluding the missing patch updates that would render an old image usable on new hardware). In another example, the patching engine 120 can also traverse the file systems and do a directory-by-directory and file-by-file comparison to compute the extent of difference between two mounted images and to determine if any of the images are sufficiently similar to one another. Two images can be sufficiently similar if the OS-vendor-provided packages and files are of the same versions. In some embodiments, the versions do not have to be identical, but should provide equivalent functionality on the same hardware component that was changed. If no sufficiently similar images are identified, then the image may remain blacklisted.

If an image is derived from another image (e.g., substantially similar to one another), then the a patching process may be applied to the unregistered or incompatible image. Patching options can be determined using any combination of factors. For example, if a determination is made that an incompatible image is related to an image that has previously been approved for new infrastructure/hardware shape, the approved image may be used to patch the incompatible image. In another example, when the images are similar but have different drivers, the previously approved image can be used to update the drivers of the incompatible image.

If a successful path has been made, patched images can be associated with an identifier, tracked, and stored for future use. As such, any successful patching will result in a new operating system image that has a new identifier. In some embodiments, a lookup table may be updated that associates old image identifiers with the unregistered or incompatible versions of the image with the identifiers of the patched images that are compatible with new hardware. The lookup table can be stored in a database (e.g., data store 504) that includes identifiers for each old/unregistered or incompatible images with the new patched or equivalent versions of previously qualified images. In some embodiments, once an image is updated or replaced to be pre-qualified/compatible, the image reference within the user's configuration can be updated to use the identifier of the patched or equivalent versions of previously qualified images, thus replacing the original image (e.g., the unregistered or incompatible image). For example, a reference for the identifier of the old image can be updated to point to the identifier of the new patched image.

In some embodiments, the qualification manager 408 can monitor image(s) 502 and notify users images are old and should be retired. By marking an image as retired, that image can be removed from having to be run through the auto-qualification process. The retirement of an image can be determined based on any combination of factors. For example, the retirement of an image can be based on the last time the image was used, a support lifespan for a given image, frequency of use for the image, etc. In some embodiments, the qualification manage 408 can notify users (e.g., via client device(s) 106) that have older images beyond a certain period (e.g., relying on obsolete hardware) will no longer support or they should update to a newer image to accommodate newer hardware.

Returning to FIG. 4, converged infrastructure management service 402 may include configuration manager 406. Configuration manager 406 may be configured to select a configuration for the smart adaptor 416. As discussed herein, the host machine 410 may be one of many provided in an IaaS environment. In some embodiments, access and/or usage of a converged network adaptor (e.g., smart adaptor 416) may be restricted.

The configuration manager 406 may be configured to launch an image (e.g., image 526) on bare metal instance 420 (or another compute instance such as compute instance 112 of FIG. 1), the configuration manager 406 may determine whether the user associated with that instance has permissions to access certain reserved features. As a non-limiting example, the smart adaptor 416 may be configured to provide non-networking functionality (e.g., cryptographic functionality, a TPM, remote virtual storage, or the like). In some embodiments, these features may be restricted based at least in part on any suitable factors and/or according to any suitable permission/access policies.

In some embodiments, the configuration manager 406 may obtain identity details (e.g., one or more credentials, bare metal instance identifiers, etc.) associated with the image and/or bare metal instance about to be launched. The configuration manager 406 may be configured to check with an identity provider (e.g., a separate service, not depicted) to determine whether the bare metal instance is authorized to access certain reserved features (e.g., the cryptographic functionality provided by smart adaptor 416). In some embodiments, if access is allowed, the configuration manager 406 may execute any suitable instructions for configuring the smart adaptor 416 to surface those properties to the host. If access is not allowed, the configuration manager 406 may similarly execute any suitable instructions that configure the smart adaptor 416 to restrict access to those features/functionality from the host.

Converged infrastructure management service 402 may include monitoring manager 404. Monitoring manager 404 may utilize a variety of data and techniques to monitor the converged network adaptors of the CSPI (e.g., converged network adaptor 414). In some embodiments, the monitoring manager 404 may detect failure(s) of converged network adaptors and, potentially, may execute a variety of remedial actions and/or techniques to attempt to recover from such failures.

Figure 6:
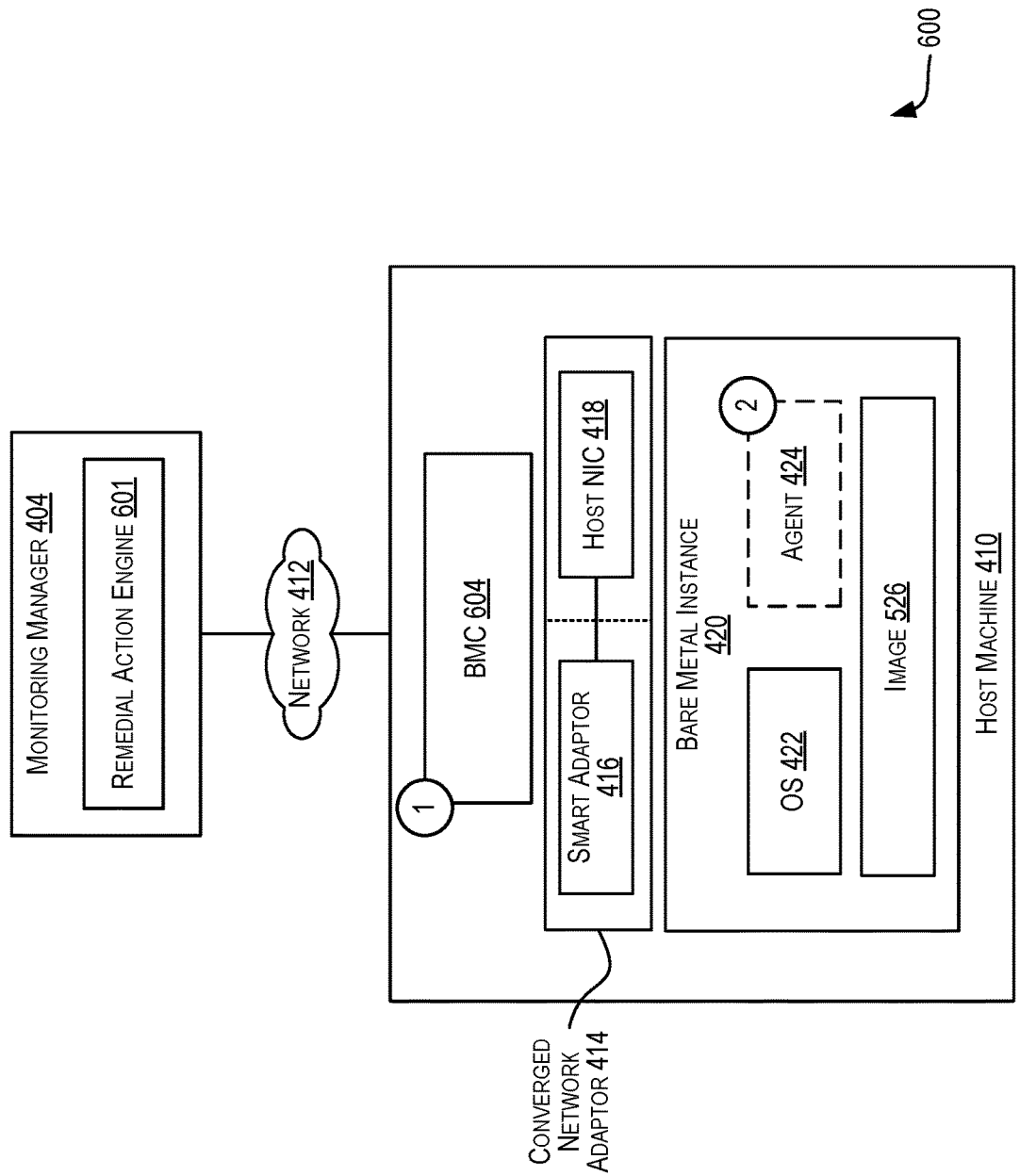
FIG. 6 is a block diagram illustrating example techniques for monitoring/detecting and recovering from a failure of a converged network adaptor, according to at least one embodiment.

By way of example, FIG. 6 is a block diagram 600 illustrating example techniques for monitoring/detecting and recovering from a failure (e.g., destabilization) of a converged network adaptor, according to at least one embodiment. The techniques described in connection with FIG. 6 may be performed by the monitoring manager 404 of FIG. 4. In some embodiments, failure or destabilization may refer to situations in which the host machine (e.g., host machine 410) hangs or crashes, is experiencing over a threshold degree of latency, exceeds a threshold degree of CPU usage, exceeds an acceptable thermal output, or the like. Destabilization events may indicate kernel failure/error, soft lockups, hard lockups or any suitable situation in which the kernel and/or OS running on top of the kernel, but may be recoverable either because the destabilization event is transient or because the event can be modulated by changing system config (e.g., either by logging-into the host machine 410 and disabling some behavior) or having some on-host automation perform such operations, by rebooting the host machine 410 or any suitable component of the host machine 410, or the like. As a non-limiting example, if a destabilization event indicate the host NIC 418 is malfunctioning, the OS 422 may not be reached by the monitoring manager 404. In this case, the monitoring manager 404 (e.g., the remedial action engine 601) may execute operations to cause the host machine 410 to be power cycled to perform a reboot. At least some remedial actions may not require a full reboot. As another example, other destabilization events (e.g., kernel panics that occur when a kernel error irrecoverably destabilizes the kernel and OS 422) may require a full reboot of host machine 410.

Additional example destabilization events may include a firmware or driver related error of a network interface (e.g., smart adaptor 416 and/or host NIC 418) that destabilizes the OS 422. A poorly configured OS 422 can sit in a destabilized state indefinitely if there are no configured last-resort recovery systems in place to drive their recovery. Typically, the physical NICs exposed to customer OSes (e.g., host NIC 418) have a fixed implementation that rarely changes once it is released, and before release, the implementation may undergo many months to years of exhaustive testing. By combining the host NIC 418 with the adaptor NIC 416 as part of a converged network adaptor 414 and making it programmable (at least the smart adaptor 416), new functionality may be introduced to meet customer need. This may result in a faster iteration cycle of firmware and/or software that may be more likely to destabilize customer workloads.

In some embodiments, the monitoring manager 404 may be configured to accept a variety of operational data that may be used to determine a likelihood that a converged network adaptor of a compute instance (e.g., bare metal instance 420) is causing destabilization on the host machine 410. In some embodiments, the operational data may include signals, events, logs, or any suitable data provided by Baseboard Management Controller (BMC) 606. In some embodiments, BMC 606 may be implemented by management software such as an Integrated Lights Out Manager (ILOM) (e.g., management software that implements a baseboard management controller specification). This operational data may be used to determine whether the host machine 410 is destabilized and/or to classify the destabilization event that is likely occurring. In some embodiments, the monitoring manager 404 may be configured to train and/or utilize one or more machine learning models that have been trained to identify whether a destabilization event is occurring and/or to identify the type of destabilization that is occurring at a given host machine. The machine learning model may be trained utilizing any suitable supervised and/or unsupervised machine learning model. As a non-limiting example, the machine learning model may be any suitable classification model, neural network, or the like. An example training process is described in more detail with respect to FIG. 7. The machine learning model may be trained using a training data set that includes sample inputs and known outputs. The sample inputs may include any suitable operational data and/or signals associated with those instances of operational data. The sample outputs may include a destabilization event associated with the inputs and/or one or more remedial actions associated with resolving the destabilization event indicated in a given example. In some embodiments, the outputs may indicate that data provided as input is indicative of a determination (e.g., destabilization is or is not occurring) and/or a type of destabilization.

In some embodiments, a predefined set of rules may be employed to identify if a host machine is experiencing destabilization and/or the type of destabilization that is likely occurring based at least in part on the operational data and/or the signals identified by the monitoring manager 404. The predefined set of rules may additionally, or alternatively, be utilized to determine one or more remedial actions to take from a predefined set of actions. These predefined set of actions may be predefined by the CSP or the customer, potentially depending on the classification of the destabilization. For example, the CSP may indicate no remedial action is to take place for a particular type of destabilization, while the customer may define one or more remedial actions to take for the same type of destabilization. Remedial actions may include, but are not limited, to rebooting the host machine 410 or any suitable component of the host machine 410, updating firmware and/or software of the converged network adaptor 414.

The monitoring manager 404 may obtain a variety of operational data from which the existence and/or type of a destabilization event may be identified (e.g., reboot duration, panic idle power draw values, serial console logs, IPMI system event log signals, CPU power consumption signals, and the like). By way of example, an expected reboot time for host machine 410 may be known and stored. In some embodiments, identifying that a reboot of the host machine 410 exceeds the expected reboot time may be one signal that can individually, or collectively with other signals, indicate a destabilization event is occurring and/or the type of destabilization event that might be occurring at host machine 410. As another example, each host machine (e.g., host machine 410) may be associated with a typical power draw range that is associated with a situation in which kernel panic is in effect. In some embodiments, when the host machine 410 has a power draw that falls outside of the typical power draw range associated with host machine 410, this signal may be used to identify an occurrence and/or type of destabilization event.

As depicted at indicator 1, operational data (e.g., signals, logs, events, or the like) may be obtained from Baseboard Management Controller (BMC) 604. In some embodiments, BMC 604 may be individual/separate service processor (e.g., an ILOM) embedded in host machine 410 that enables a full in-band management interface and a full out-of-band management interface that provide remote management capabilities of the host machine 410. BMC 604 may include dedicated hardware and/or software for providing logs and/or signals/data that is associated with managing the host machine 410. In some embodiments, these logs and/or signals/data may utilize interfaces and/or ports that are separate from other network traffic.

BMC 604 (e.g., an ILOM or other) or a serial console (e.g., operating as part of smart adaptor 416 and/host NIC 418) may be configured to provide log entries (e.g., serial console logs, system logs, or the like), or these log entries may be otherwise obtained (e.g., requested, collected, etc.) by monitoring manager 404. In some embodiments, the logs/log entries may be parsed to identify particular messages, assertions, output, or the like. In some embodiments, the monitoring manager 404 may be configured to identify kernel panic error messages, soft or hard lockup messages, boot informational messages, and the like. In some embodiments, the monitoring manager 404 may maintain record of particular error messages/assertions (e.g., CONSOLE_PANIC, CONSOLE_LOCKUP, etc.) to maintain status of the host machine 410. Once one or more remedial actions are performed (e.g., a system reboot of host machine 410), these records may be cleared.

BMC 604 (e.g., an ILOM or other) may be configured to provide reboot durations, panic idle power draw values, CPI power consumption signals, thermal values, or the like. Any suitable portion of such data may be utilized by the monitoring manager 404 to identify, assert, and/or record one or more signals indicating that one or more destabilization events may be occurring at the host machine 410.

Monitoring manager 404 may pull or otherwise obtain system event logs (e.g., Host Intelligent Platform Management Interface (IPMI) event logs) from the host machine 410 (e.g., via BMC 604). In some embodiments, the BMC 604 may transmit these system logs to monitoring manager 404. The monitoring manager 404 may parse each of these event logs. In some embodiments, if there is a SEL record for a kernel panic error message, the monitoring manager 404 may assert/record a SEL_PANIC signal to strongly suggests rebooting. A subsequent reboot (or other remedial action) may cause the monitoring manager 404 to clear this assertion/record.

Monitoring manager 404 may pull or otherwise obtains (e.g., periodically, every 30 seconds, etc.) CPU power draw values for the host machine 410 (e.g., via BMC 604). In some embodiments, the BMC 604 may transmit CPU power draw values to monitoring manager 404. The monitoring manager 404 may be configured to determine whether the CPU power draw settles within a predefined panic idle power draw range associated with the host machine 410 (e.g., for longer than the expected reboot duration). If so, the monitoring manager 404 may assert/record a POWER_PANIC signal to indicate that a reboot might be needed. In situations where the power draw settles briefly in the panic idle draw range but then swings to indicate an uptick of activity due to a reboot, the monitoring manager 404 may clear the POWER_PANIC signal to indicate that a reboot might no longer be needed.

In some embodiments, monitoring manager 404 may utilize one or more customer preferences (e.g., customer preference data) when making determinations of whether to initiate one or more remedial action. In some embodiments, customer preference data may identify one or more remedial actions identified by the customer of any suitable signal (e.g., POWER_PANIC, CONSOLE_PANIC, CONSOLE_LOCKUP, and the like) identified by the monitoring manager 404. In some embodiments, the customer preference data may indicate one or more notifications that may be provided in response to any suitable signal identified by the monitoring manager 404. By way of example, the monitoring manager 404 may provide, via any suitable user interface provided at client device(s) 106 of FIG. 1, a message, alarm, or text-based notification indicating the identification of any suitable signal (e.g., a signal indicative of a destabilization of host machine 410).

As a non-limiting example, the monitoring manager 404 may include a remedial action engine (e.g., remedial action engine 601) or the remedial action engine may be provided via a separate service or component accessible and/or in communication with the monitoring manager 404. In some embodiments, the medial engine may query or otherwise obtain signals identified by the monitoring manager 404 (e.g., CONSOLE_PANIC, CONSOLE_LOCKUP, and/or POWER_PANIC, among others). In some embodiments, if either or both of CONSOLE_PANIC and POWER_PANIC signals are asserted/recorded, the remedial action engine 601 may determine whether the customer's preference data has notifications enabled. If so, a notification may be provided via a user interface and/or via an electronic communication such as an email or push notification provided via client device(s) 106 or another user device. In some embodiments, if the customer's preference data has remedial actions enabled (e.g., a remedial action of a server reboot is identified when CONSOLE_PANIC and POWER_PANIC signals are asserted), the remedial action engine 601 may execute instructions to cause the remedial action(s) identified to be performed (e.g., causing host machine 410 to reboot). As another example, if monitoring manager 404 has asserted/recorded a CONSOLE_LOCKUP signal, and the customer's preference data indicates notifications are enabled, the customer may be notified in accordance with the preference data (e.g., by sending an email when the preference data indicates an email should be sent when this signal is asserted/recorded).

As a non-limiting example, the remedial action engine 601 may query monitoring manager 404 periodically to determine whether the CONSOLE_PANIC, CONSOLE_LOCKUP, SEL_PANIC, and POWER_PANIC signals have been asserted/recorded. If any or all of these signals have been asserted/recorded, the remedial action engine 601 may consult customer preference data. If the customer preference data indicates notifications are enabled, the customer may be notified in accordance with the preference data. If customer preference data indicates that remedial actions are enable, the remedial action engine 601 may execute operations to cause one or more remedial actions to be performed (e.g., to reboot the server, reinstall firmware or software at the smart adaptor 416 and/or the host NIC 418, or the like). This particular example provides a scenario in which serial logs, system events logs, and power draw signals are used to determine destabilization has occurred and whether to notify the customer and/or perform one or more remedial actions.

In some embodiments, the signals identified by the monitoring manager 404 may be weighted differently. By way of example, CONSOLE_PANIC, SEL_PANIC, and POWER_PANIC may individually be weighted less heavily than the CONSOLE_LOCKUP signal. This may be based at least in part on the knowledge that there are times when there will be a soft/hard lockup that never result in panic. Thus, in some embodiments, one or more remedial actions that employ more drastic tactics (e.g., a full server reboot) may be reserved for instances in which the CONSOLE_LOCKUP signal is asserted/recorded. Some rules employed by the remedial action engine 601 may require multiple less severe signals (e.g., CONSOLE_PANIC and POWER PANIC) before a particular remedial action is performed. The identification of multiple less severe signals may be used by the remedial action engine 601 to identify a higher confidence that a destabilization event is occurring. Thus, the identification of multiple less sever signals may increase the confidence that a destabilization event is occurring and may result in one or more remedial actions being performed that otherwise would not have been if any one of those same signals was identified alone.

In some embodiments, the machine learning model trained as described in connection with FIG. 7 may be utilized to identify a confidence value and/or one or more remedial action recommendations based at least in part on the data obtained and/or signals asserted/recorded by the monitoring manager 404. As a non-limiting example, the monitoring manager 404 may obtain data from any suitable source (e.g., BMC 604, Agent 424, or any suitable combination of the above). The monitoring manager 404 may analyze the data and assert/record any suitable signal indicating an occurrence of a destabilization event (e.g., console lockup, console panic, power panic, SEL panic, and/or the like). The data obtained by the monitoring manager 404 and/or the signals asserted/recorded by the monitoring manager 404 may be provided (e.g., by the remedial action engine 601) to the previously trained machine learning model. The machine learning model may take such data as input and output a confidence value indicating the existence of a destabilization event. In some embodiments, the machine learning model may additionally, or alternatively, identify one or more remedial actions. In some embodiments, destabilization events that are associated with a confidence score generated by the machine learning model that exceed a predefined threshold (e.g., 75% confidence value) may be presented to the user. For example, identified destabilization events that are 75% likely to be occurring based at least in part on the output provided by the machine learning model and/or the remedial actions corresponding to those events may be presented to the user (e.g., via client device(s) 106) via any suitable user interface. The user may select and/or permitting, selecting, and/or rejecting the remedial actions using said user interface. If user input is received permits/selects one or more remedial actions, the remedial action engine 601 may be configured to receive this input and execute operations for performing the permitted/selected remedial action(s).

As depicted at indicator 2, the customer may optionally configure bare metal instance 420 with agent 424. In some embodiments, agent 424 may operate as part of OS 422. Agent 424 may be a host-based software component (e.g., a device driver and/or software agent) within OS 422 that can be configured to send data (e.g., beacon signal data to the smart adaptor 416 portion of the converged network adaptor 414 (e.g., via a dedicated, administrative channel not visible to the client). Beacon signal data may include any suitable data known/accessible to the OS 422 and/or agent 424. In some embodiments, the channel used to transmit these beacon signals may be write-only and potentially throttled. In some embodiments, the smart adaptor 416 may be configured to forward and suitable information associated with these beacon signals to monitoring manager 404. Monitoring manager 404 may utilize the data provided in the beacon signal data as an additional signal from which destabilization events may be determined. In some examples, the beacon signal data may be combined with the operational data obtained from BMC 604, or the beacon signal data may be used alone. As a non-limiting example, the beacon signal data may be used by the monitoring manager 404 to identify a failure and/or destabilization event. For example, the agent 424 may be configured to send beacon signal data at a predefined periodicity or according to a predefined schedule that is known to the monitoring manager 404. If the expected beacon signal data is not received according to that schedule/periodicity (e.g., a threshold period of time has elapsed since a last instance of beacon signal data was received), the monitoring manager 404 may be configured to assert/record a signal indicating a particular destabilization event is likely occurring. This signal and/or beacon signal data may be similarly utilized as the signals/operational data described above to identify one or more remedial actions. In some embodiments, this signal and/or beacon signal data may be used with a predefined rule set and/or as input to the machine-learning model described in connection with FIG. 7. In some embodiments, the rules and/or machine learning model may identify one or more remedial actions to be taken to resolve the destabilization event indicated by the signal and/or beacon signal data.

In some embodiments, monitoring manager 404 may obtain load balancer health information from a load balancer (not depicted) associated with host machine 410. Additionally, or alternatively, the monitoring manager 404 may transmit data to the host machine 410 and utilize a response (or lack of response) from the data transmitted as an additional indication of whether a destabilization event is occurring and/or what type of destabilization event is likely occurring, at host machine 410. As yet another example, monitoring manager 404 may be configured to receive and/or obtain network traffic flow pattern data (e.g., from host NIC 418 via smart adaptor 416, and/or from smart adaptor 416 directly) that indicate changes in or discrepancies between expected network traffic flow. By way of example, smart adaptor 416 may be configured to transmit network traffic flow data indicating when outbound and/or inbound packet processing falls outside an expected range (e.g., when the number of expected outbound packets falls under a predefined threshold value indicating a number of expected outbound packets).

In some embodiments, one or more remedial actions may be initiated by the remedial action engine 601 and/or by the agent 424. By way of example, agent 424 may be configured to trigger a lightweight hardware re-initialization/config-restoration. This type of reboot may be faster than a full hardware reset. In some examples, the agent 424 may monitor the host machine 410 as in boots, The agent 424 may inspect the system and record and/or transmit operational data and/or and trigger one or more remedial actions if/when a partial crash occurs. As a non-limiting example, the agent 424 may check OS/kernel features of the OS 422 to see if a lightweight reboot is supported. In some embodiments, the agent 242 may call a metadata service (not depicted) to see what remediations the OS image/BM shape combination utilized at the host machine 410 can support from within the host.

Figure 7:
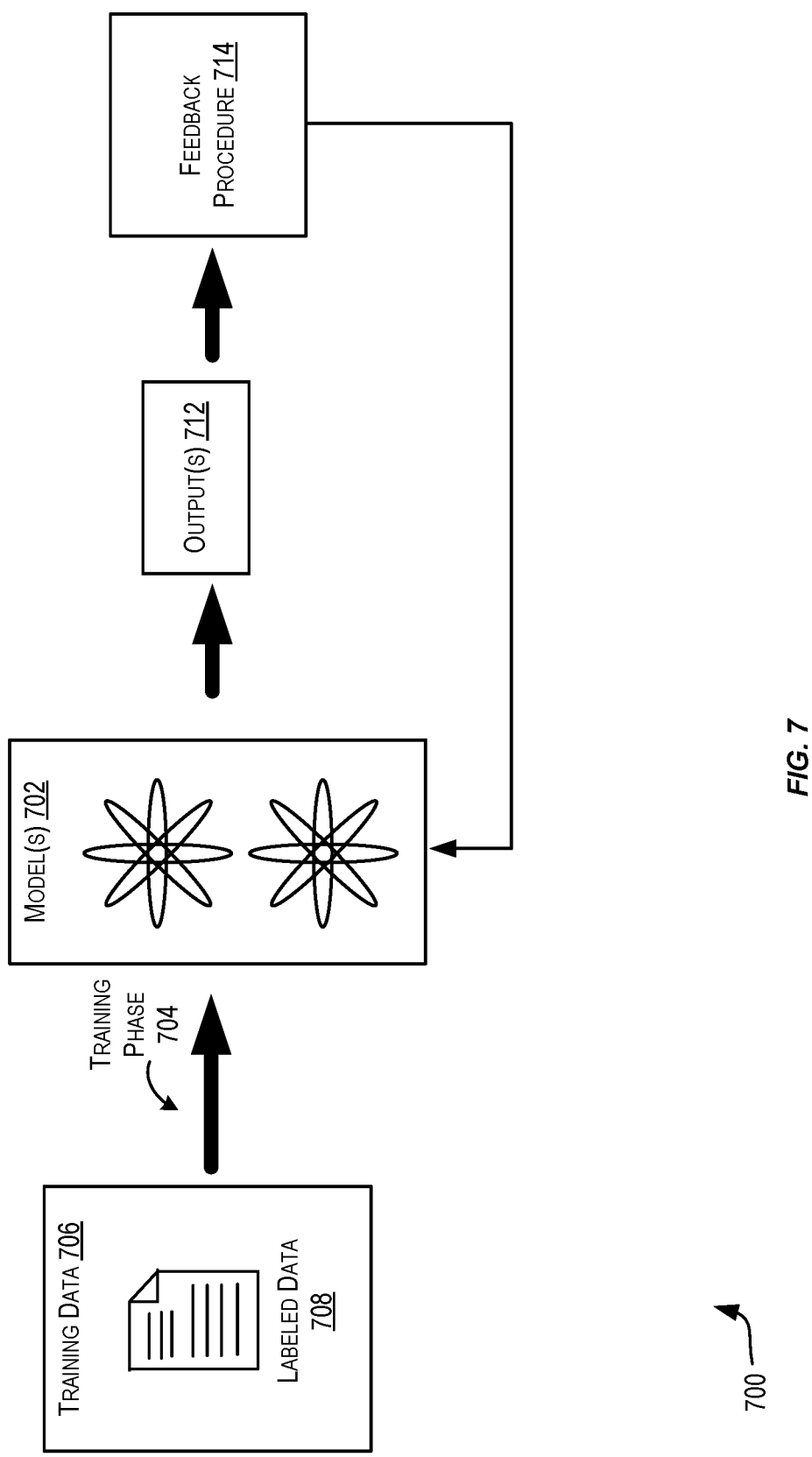
FIG. 7 illustrates a flow for an example method for training one or more machine-learning models to identify one or more failures associated with a converged network adaptor, in accordance with at least one embodiment.

FIG. 7 illustrates a flow for an example method for training one or more machine-learning models (e.g., model(s) 702) to identify one or more failures (e.g., destabilization events) associated with a converged network adaptor, in accordance with at least one embodiment. In some embodiments, the model(s) 702 may be trained to identify one or more confidence scores indicating the likelihood that a particular failure/destabilization event is occurring and/or one or more remedial actions to be taken to resolve the identified failure/destabilization event. The method 700 may be performed by the monitoring manager 404 of FIG. 6 and/or, at least partially, by a computing component separate and distinct from the monitoring manager 404. In some embodiments, a separate component/service may perform the method 700 and trained version(s) of machine learning models (e.g., model(s) 702) may be utilized by the monitoring manager 404.

The model(s) 702 may be trained using any suitable supervised machine-learning algorithms and training data 706. A "supervised machine-learning algorithm" refers to a machine learning task that includes learning an inferred function that maps an input to an output based on a labeled training data set for which example input/output pairs are known. In some embodiments, any suitable number of model(s) 702 may be trained during training phase 704. In some embodiments, training data 706 may include labeled data 708 in which input samples are labeled (e.g., with an indication that the input is indicative, or not indicative, of a destabilization event in general, or a particular destabilization event). In some embodiments, the training data 706 may include labels indicating one or more remedial actions to be performed to resolve the associated destabilization event indicated in a given training data example.

The model(s) 702 may include any suitable number of models. One or more of model(s) 702 may include a machine-learning model (e.g., a classification model, a neural network, etc.) that is trained using a combination of features (e.g., feature vectors) of training data 706 that includes any suitable combination of: 1) operational data provided by BMC 604 (e.g., an Integrated Lights Out Manager (ILOM)), 2) beacon signal data provided by agent 424, 3) one or more asserted/recorded signals identified by monitoring manager 404 (e.g., based at least in part on the operational data and/or beacon signal data described above).

As referred to herein, "feature vectors" include any suitable number of multi-dimensional vector representations, each multi-dimensional vector representation representing aspects of the training data 706 (e.g., attributes and/or aspects of the operational data and/or beacon signal data provided in each example). In some embodiments, the model(s) 702 may include a neural network that is configured with one or more layers that are configured to generate a feature vector from a training data example, or the training data example may include a feature vector. Generally, any suitable feature vector discussed herein may be a vector of any suitable size (e.g., 128 dimensions, 256 dimensions, etc.) that represents various features of the corresponding data.

In some embodiments, at least one of the model(s) 702 can be trained during training phase 704 using a supervised learning algorithm and labeled data 708 to identify an existence of one or more destabilization events, one or more classifications/labels associated with one or more destabilization events, one or more confidence scores associated with the one or more destabilization events identified, and/or one or more labels corresponding to remedial actions that may be used to resolve the identified destabilization events. Labeled data 708 may be any suitable combination of: the data obtained from BMC 604, or any suitable data discussed in connection with FIG. 6. Using the labeled data 708, a model (e.g., an inferred function, a neural network) may be trained during training phase 704 that may be used to identify an existence of a destabilization event, one or more classifications/labels/confidence scores associated with one or more destabilization events, and/or one or more remedial actions based at least in part on subsequent data provided as input.

In some embodiments, any suitable portion of the training data 706 may be utilized during the training phase 704 to train the model(s) 702. For example, 70% of labeled data 708 may be utilized to train the model(s) 702. Once trained, or at any suitable time, the model(s) 702 may be evaluated to assess their quality (e.g., accuracy). By way of example, a portion of the examples of labeled data 708 may be utilized as input to the model(s) 702 in order to generate output(s) 712. By way of an example, an output of output(s) 712 may be compared to a corresponding example of the labeled data 708 for which label(s) and/or confidence score(s) already known. If the output matches the label(s)/score(s) already known from the training data 706, that output may be deemed accurate. Any suitable number of examples of the training data 706 may be utilized and a number of accurate outputs may be compared to the total number of examples provided to determine an accuracy value for a given model that quantifies a degree of accuracy for the model. For example, if 90 out of 100 of the input examples generate output label(s)/score(s) that match the previously known example label(s)/score(s), the model being assessed may be determined to be 90% accurate.

In some embodiments, as the model(s) 702 are utilized for subsequent inputs, the subsequent output generated by the model(s) 702 may be added to corresponding input and used to retrain and/or update the model(s) 702. In some embodiments, the example may not be used to retrain or update the model until feedback procedure 714 is executed. In feedback procedure 714, the example and the corresponding output generated for the example by one of the model(s) 702 may be presented to a user and the user may identify whether the label(s) (e.g., indicating the existence of or identifying the destabilization event, indicating corresponding remedial action(s), or the like) and/or score(s) is correct for the given example. Said another way, the user can verify whether the output identified for the example is accurate. If so, the feedback procedure 714 may include operations that cause the approved example to be added to training data 706 and used to update and/or retrain the model(s) 702 (e.g., the model to which the example corresponds).

The method 700 may be performed any suitable number of times at any suitable interval and/or according to any suitable schedule such that the accuracy of the model(s) 702 are improved over time.

Figure 8:
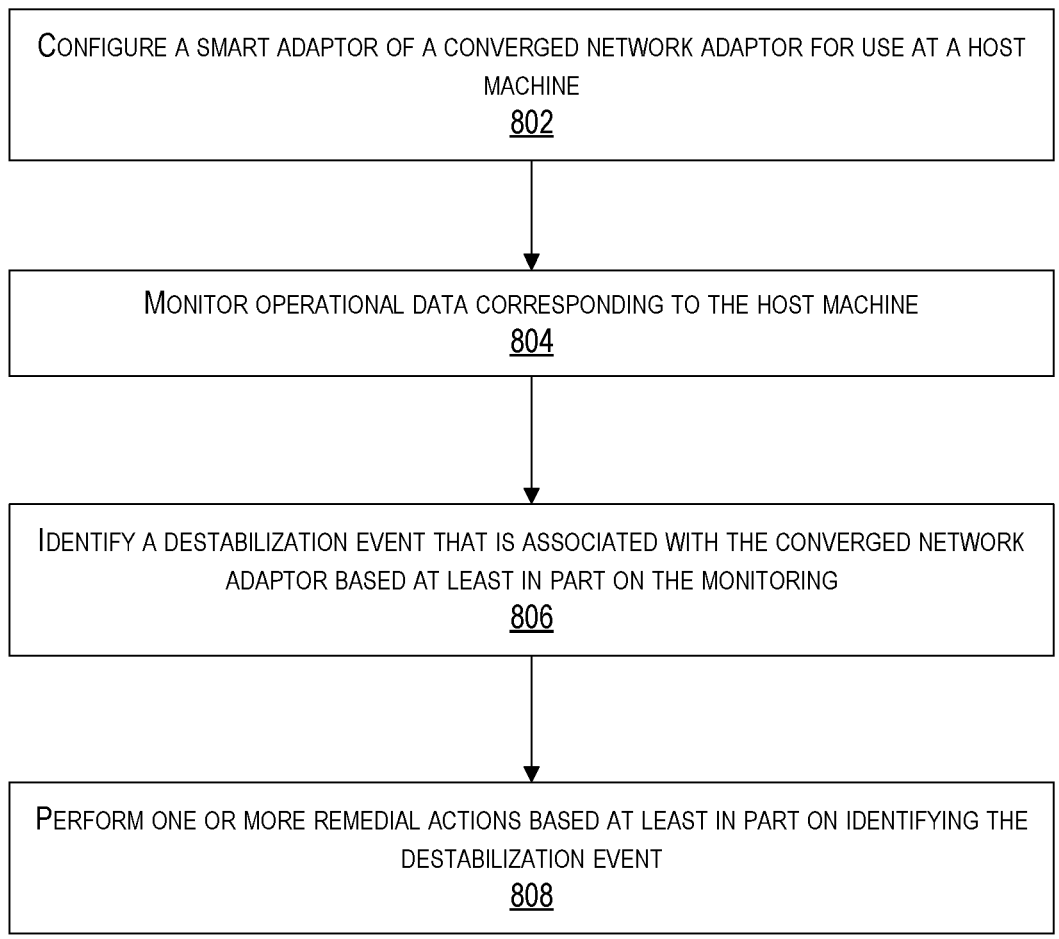
FIG. 8 is a block diagram illustrating an example method for utilizing of a converged network adaptor, in accordance with at least one embodiment.

FIG. 8 is a block diagram illustrating an example method for 800 utilizing of a converged network adaptor (e.g., the converged network adaptor 204 of FIG. 2), in accordance with at least one embodiment. The method 800, at least in part, may be performed by any suitable portion of the converged infrastructure management service 402 of FIG. 4.

The method 800 may include more or fewer operations than depicted in FIG. 8, and these and/or the operations depicted in FIG. 8 may be performed in any suitable order.

The method 800 may begin at 802, where a smart adaptor of a converged network adaptor may be configured (e.g., by the configuration manager 406 of FIG. 4, a component of the converged infrastructure management service 402) for use at the host machine. The converged network adaptor (e.g., converged network adaptor 204) may be provided at a host machine (e.g., host machine 202 of FIG. 2) of a cloud computing environment (e.g., cloud computing environment 100 of FIG. 1, on, for example, cloud service provider infrastructure 103). In some embodiments, the converged network adaptor may comprise first functionality associated with a host network interface card (e.g., host NIC 205) and second functionality associated with a smart adaptor or smart NIC such as NVD 206 of FIG. 2, an example of a smart adaptor. In some embodiments, the host network interface card may be visible to a host operating system executing at the host machine (e.g., OS 422 of FIG. 4). The smart adaptor may be undetectable by computing components of the host machine (e.g., OS 422). In some embodiments, the smart adaptor may be configured with one or more features (e.g., features corresponding to performing cryptographic operations, providing remote storage, and the like).

In some embodiments, configuring the smart adaptor may comprise determining (e.g., based at least in part on an identifier corresponding to the host machine) a subset of permitted features selected from the one or more features of the virtual network interface card. In some embodiments, the subset of permitted features may be features that are permitted to be utilized at the host machine. Configuring the smart adaptor may further comprise executing operations to cause the smart adaptor to: 1) expose an interface associated with the subset of permitted features, or 2) restrict access to features other than the subset of permitted features. In some embodiments, the one or more features of the smart adaptor may comprise at least one of: 1) providing cryptographic operations, 2) providing storage that is remote with respect to storage provided by the host machine, 3) providing virtual cloud network management operations.

At 804, operational data corresponding to the host machine may be monitored (e.g., by the monitoring manager 404 of FIG. 4, a component of the converged infrastructure management service 402). In some embodiments, the operational data may be obtained from at least one of: 1) an integrated lights out manager (ILOM), an implementation of BMC 604 of FIG. 6, 2) a baseboard management controller (e.g., BMC 604), 3) an agent operating at an operating system executing at the host machine (e.g., agent 424 of FIGS. 4 and 6), 4) a load balancer associated with the host machine, 5) a smart adaptor (e.g., smart adaptor 416 of FIG. 6) or 6) the host network interface card of the host machine (e.g., host NIC 418 of FIG. 6). In some embodiments, the operational data may comprise at least one: 1) a reboot duration value, 2) a panic idle power draw value, 3) console logs or console log related data, 4) system event logs or system event log related data, 5) CPU power consumption data, 6) network traffic flow data, or any suitable data discussed in connection with FIG. 6.

At 806, a destabilization event that is associated with the converged network adaptor may be identified based at least in part on the monitoring. In some embodiments, a set of predefined rules may be utilized to determine a destabilization event is likely occurring based at least in part on the operational data obtained at 806. In some embodiments, identifying the destabilization event may comprise providing input (e.g., the operational data, the signals generated from the operational data by monitoring manager 404, etc.) to a machine learning model (e.g., one or more models of model(s) 702). In some embodiments, the machine learning model may be trained to identify destabilization events from input data (e.g., operational data and/or signals generated from operational data). As described in connection with FIG. 7, the machine learning model (e.g., a classification model, a neural network, etc.) may be previously trained using a supervised learning algorithm and training data comprising training data examples individually being associated with operational data, or data generated from operational data, and a known destabilization event label.

At 808, one or more remedial actions (e.g., sending/presenting a notification, rebooting a portion of the components of the host machine, performing a full reboot of the host machine, reinstalling firmware and/or software associated with the host NIC or the virtual NIC, etc.) may be performed (e.g., by a remedial action engine 601 of FIG. 6, a component of the converged infrastructure management service 402) based at least in part on identifying the destabilization event.

In some embodiments, although not depicted in FIG. 8, the method 800 may further comprise operations for: 1) initiating an auto-qualification process for pre-testing one or more images with the converged network adaptor; 2) booting, at a second host machine, each of the one or more images, the second host machine being configured to operate into an isolated network and configured with an instance of the converge network adaptor; and/or 3) associating each of the one or more images with a label that indicates a respective image is stable or unstable based at least in part on identifying whether a given image booted fully at the second host machine, wherein a corresponding image that is associated with an unstable label indicating the corresponding image is unstable is restricted from being deployed to infrastructure components, including the host machine, that are configured with the converged network adaptor.

Example IaaS Environments

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will request the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed should first be set up. In some instances, the provisioning can be done manually, a provisioning tool may be utilized to provision the resources, and/or deployment tools may be utilized to deploy the code once the infrastructure is provisioned.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will request the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed should first be set up. In some instances, the provisioning can be done manually, a provisioning tool may be utilized to provision the resources, and/or deployment tools may be utilized to deploy the code once the infrastructure is provisioned.

Figure 9:
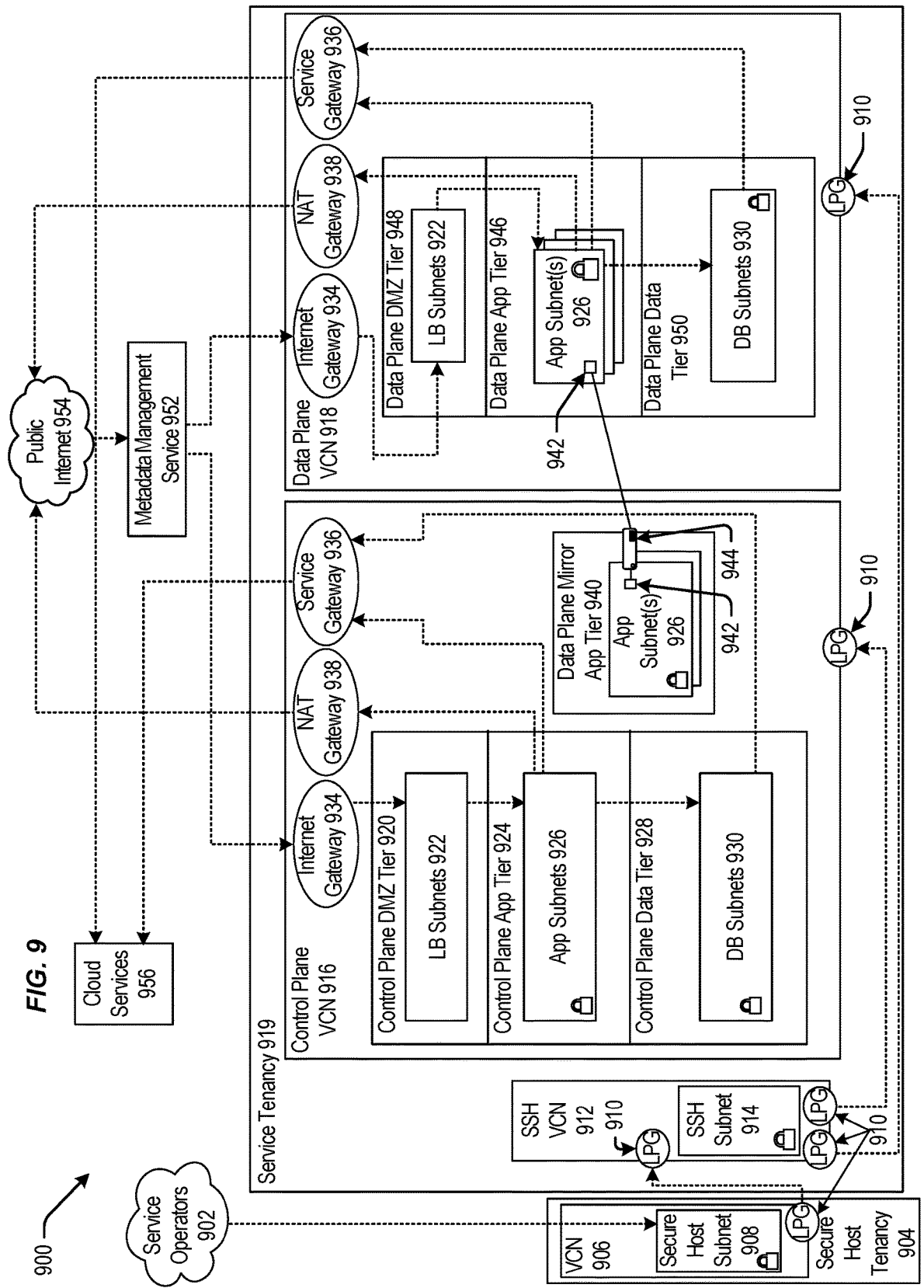
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
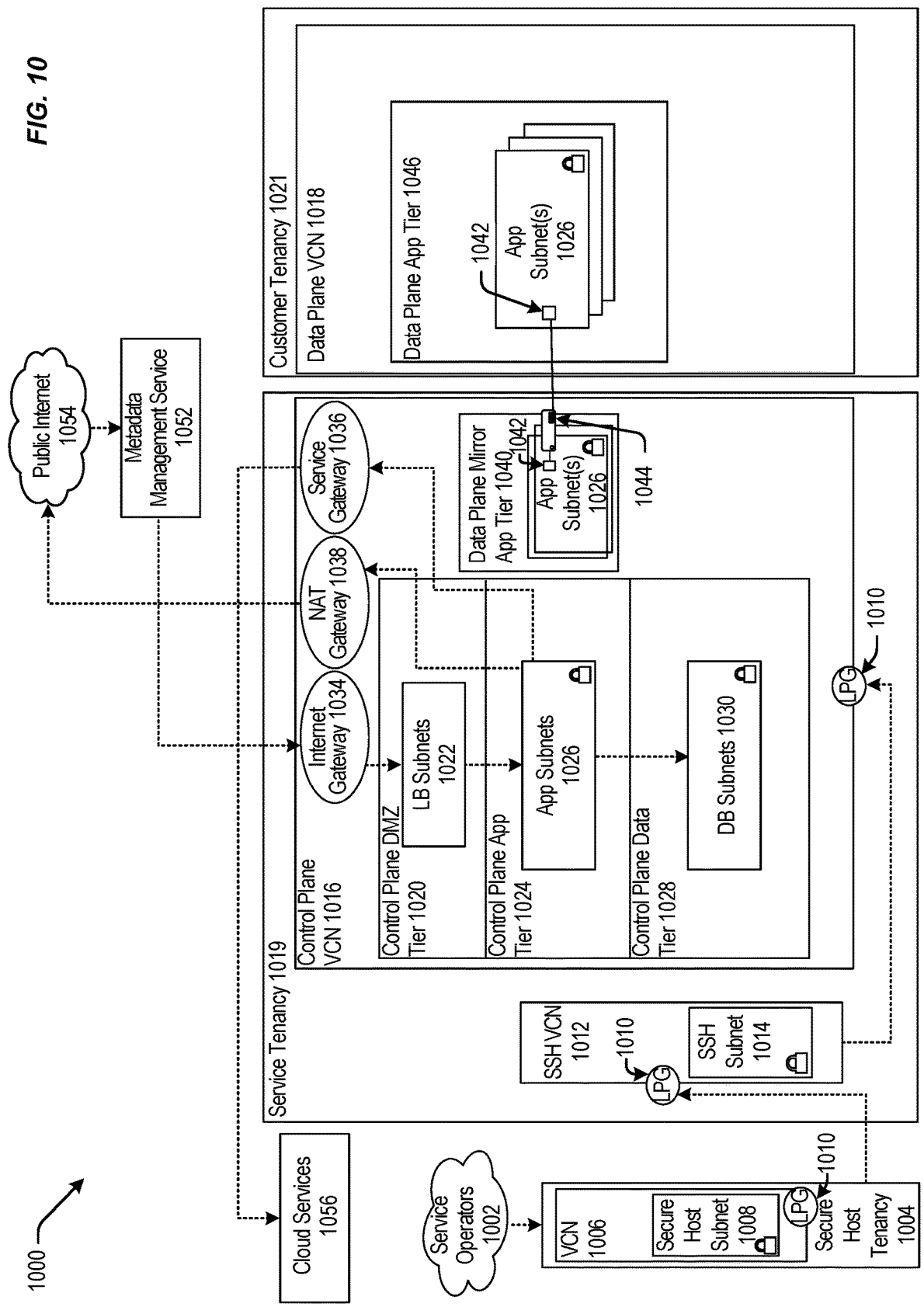
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
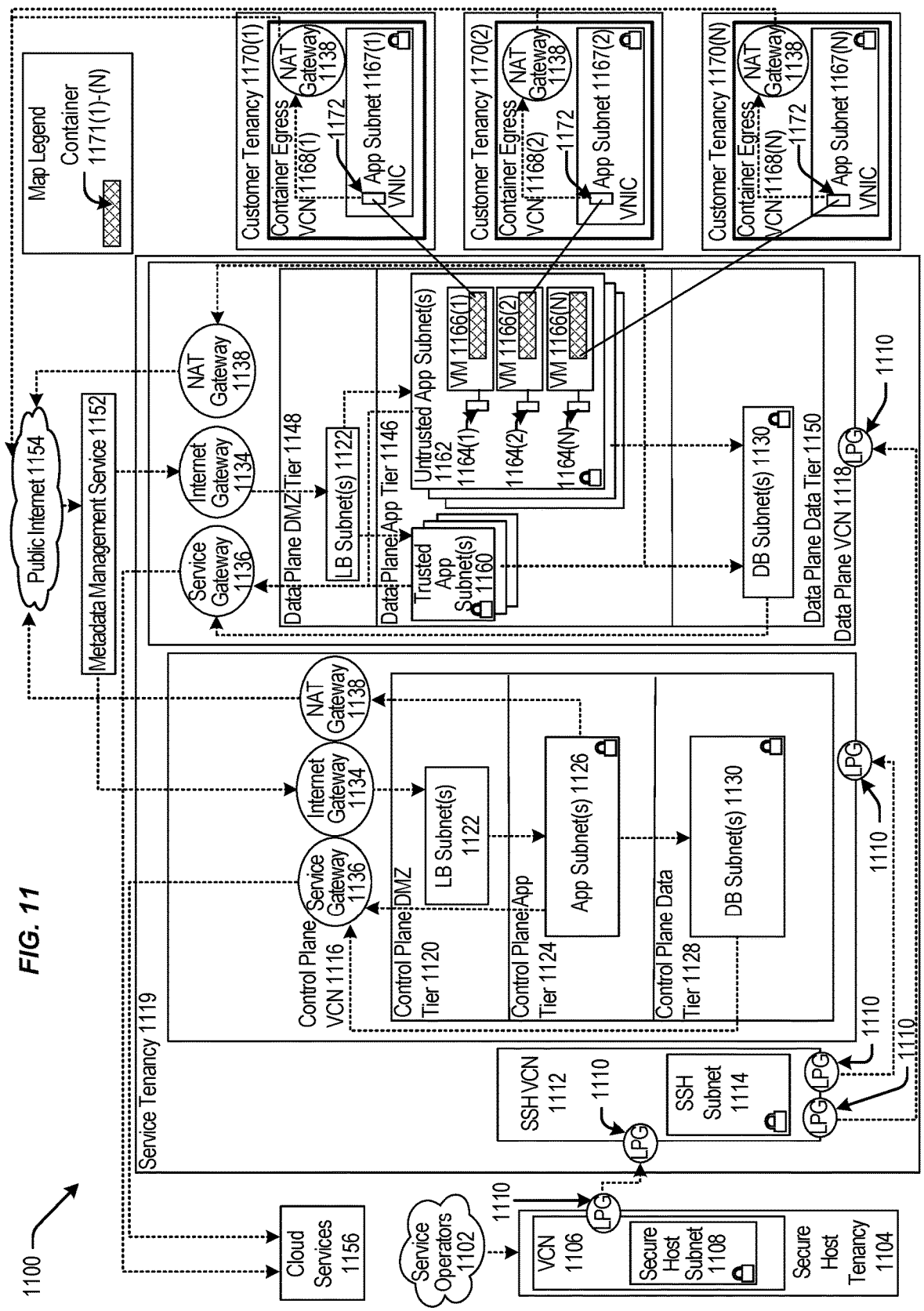
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
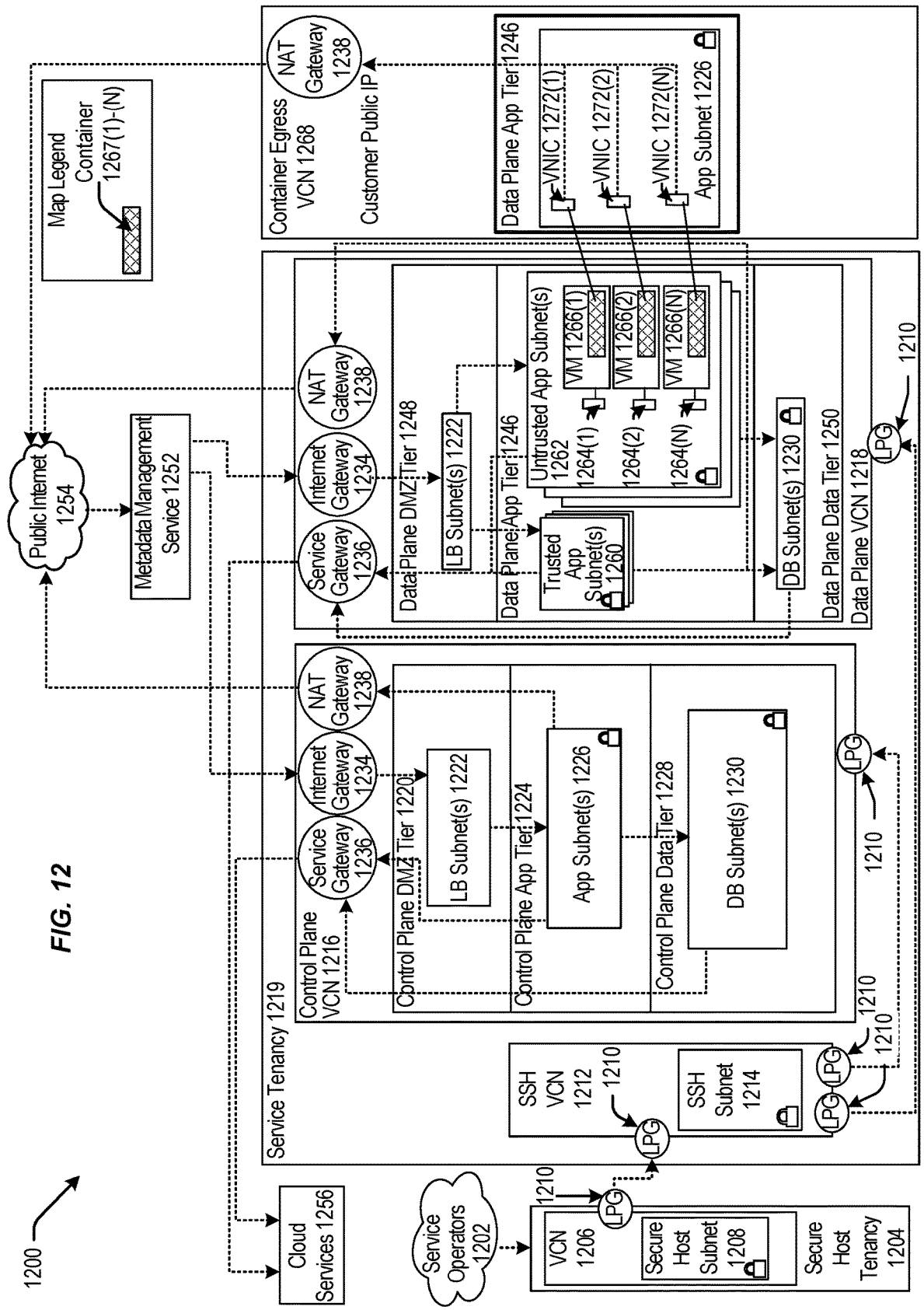
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262

(e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
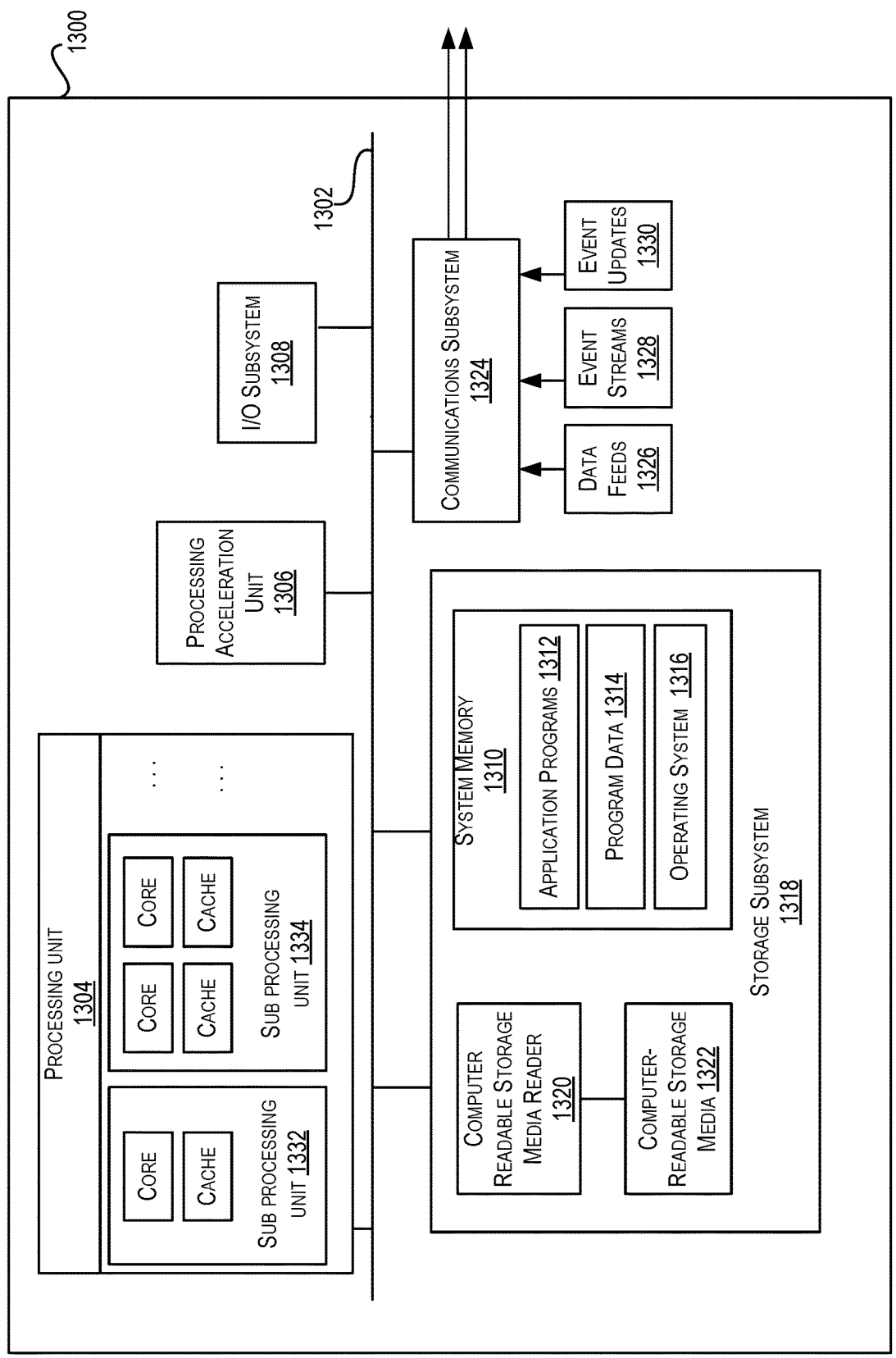
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random-access memory (RAM)) and/or non-volatile memory (such as read-only memory (ROM), flash memory, etc.). Different types of RAM configurations may be provided including a static random-access memory (SRAM), a dynamic random-access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1304, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1304, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1304, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    configuring, by a converged infrastructure management service of a cloud computing environment, a smart adaptor of a converged network interface card for use at a host machine of the cloud computing environment, the converged network interface card being a hardware component comprising 1) a first storage partition with which first functionality associated with a host network interface card is provided and 2) a second storage partition associated with the smart adaptor and with which second functionality associated with providing network virtualization functions related to at least one virtual cloud network is provided, the second storage partition being hidden from a host operating system executing at the host machine, the converged network interface card being configured with an image that has been booted at a second host machine as part of an auto-qualification process for the image;
    monitoring, by the converged infrastructure management service of the cloud computing environment, operational data corresponding to the host machine;
    identifying, by the converged infrastructure management service of the cloud computing environment, a destabilization event that is associated with the converged network interface card based at least in part on the monitoring; and
    performing, by the converged infrastructure management service of the cloud computing environment, one or more remedial actions based at least in part on identifying the destabilization event.

2. The computer-implemented method of claim 1, wherein the smart adaptor is configured with one or more features, and where configuring the smart adaptor comprises:
    determining, based at least in part on an identifier corresponding to the host machine, a subset of permitted features selected from the one or more features of the smart adaptor, the subset of permitted features being features that are permitted to be utilized at the host machine; and
    executing operations to cause the smart adaptor to 1) expose an interface associated with the subset of permitted features, or 2) restrict access to features other than the subset of permitted features.

3. The computer-implemented method of claim 1, further comprising:
    initiating the auto-qualification process for pre-testing one or more images with the converged network interface card;
    booting, at the second host machine, each of the one or more images, the second host machine being configured to operate into an isolated network and configured with an instance of the converge network interface card; and
    associating each of the one or more images with a label that indicates a respective image is stable or unstable based at least in part on identifying whether a given image booted fully at the second host machine, wherein a corresponding image that is associated with an unstable label indicating the corresponding image is unstable is restricted from being deployed to infrastructure components, including the host machine, that are configured with the converged network interface card.

4. The computer-implemented method of claim 1, wherein identifying the destabilization event further comprises providing input to a machine learning model trained to identify destabilization events from input data, the machine learning model being previously trained using a supervised learning algorithm and training data comprising training data examples individually being associated with corresponding operational data, or data generated from the corresponding operational data, and a known destabilization event label.

5. The computer-implemented method of claim 1, wherein the operational data is obtained from at least one of: 1) an integrated lights out manager, 2) a baseboard management controller, 3) an agent operating at an operating system executing at the host machine, 4) a load balancer associated with the host machine, 5) the smart adaptor, or 6) the host network interface card of the host machine.

6. The computer-implemented method of claim 1, wherein the operational data comprises at least one: 1) a reboot duration value, 2) a panic idle power draw value, 3) console logs or console log related data, 4) system event logs or system event log related data, 5) CPU power consumption data, or 6) network traffic flow data.

7. A converged infrastructure management service of a cloud computing environment, comprising:
one or more processors; and
one or more memories storing computer-executable instructions that, when executed with the one or more processors, cause the converged infrastructure management service to:
configure, by the converged infrastructure management service, a smart adaptor of a converged network interface card operating at a host machine of the cloud computing environment, the converged network interface card being a hardware component comprising 1) a first storage partition with which first functionality associated with a host network interface card is provided and 2) a second storage partition associated with the smart adaptor and with which second functionality associated with providing network virtualization functions related to at least one virtual cloud network is provided, the second storage partition being hidden from a host operating system executing at the host machine, the converged network interface card being configured with an image that has been booted at a second host machine as part of an auto-qualification process for the image;
monitor, by the converged infrastructure management service, operational data corresponding to the host machine;
identify, by the converged infrastructure management service, a destabilization event that is associated with the converged network interface card based at least in part on the monitoring; and
perform, by the converged infrastructure management service, one or more remedial actions based at least in part on identifying the destabilization event.

8. The converged infrastructure management service of claim 7, wherein the smart adaptor is configured with one or more features, and where configuring the smart adaptor comprises:
determining, based at least in part on an identifier corresponding to the host machine, a subset of permitted features selected from the one or more features of the smart adaptor, the subset of permitted features being features that are permitted to be utilized at the host machine; and
executing operations to cause the smart adaptor to 1) expose an interface associated with the subset of permitted features, or 2) restrict access to features other than the subset of permitted features.

9. The converged infrastructure management service of claim 7, wherein executing the computer-executable instructions further causes the converged infrastructure management service to:
initiate the auto-qualification process for pre-testing one or more images with the converged network interface card;
boot, at the second host machine, each of the one or more images, the second host machine being configured to operate into an isolated network and configured with an instance of the converge network interface card; and
associate each of the one or more images with a label that indicates a respective image is stable or unstable based at least in part on identifying whether a given image booted fully at the second host machine, wherein a corresponding image that is associated with an unstable label indicating the corresponding image is unstable is restricted from being deployed to infrastructure components, including the host machine, that are configured with the converged network interface card.

10. The converged infrastructure management service of claim 7, wherein the operational data is obtained from at least one of: 1) an integrated lights out manager, 2) a baseboard management controller, 3) an agent operating at an operating system executing at the host machine, 4) a load balancer associated with the host machine, 5) the smart adaptor, or 6) the host network interface card of the host machine.

11. The converged infrastructure management service of claim 7, wherein the operational data comprises at least one: 1) a reboot duration value, 2) a panic idle power draw value, 3) console logs or console log related data, 4) system event logs or system event log related data, 5) CPU power consumption data, or 6) network traffic flow data.

12. A non-transitory computer-readable medium comprising executable instructions that, when executed with one or more processors of a converged infrastructure management service within a cloud computing environment cause the converged infrastructure management service to:
configure, by the converged infrastructure management service, a smart adaptor of a converged network interface card operating at a host machine of the cloud computing environment, the converged network interface card being a hardware component comprising 1) a first storage partition with which first functionality associated with a host network interface card is provided and 2) a second storage partition associated with the smart adaptor and with which second functionality associated with-providing network virtualization functions related to at least one virtual cloud network is provided, the second storage partition being hidden from a host operating system executing at the host machine, the converged network interface card being configured with an image that has been booted at a second host machine as part of an auto-qualification process for the image;
monitor, by the converged infrastructure management service, operational data corresponding to the host machine;
identify, by the converged infrastructure management service, a destabilization event that is associated with the converged network interface card based at least in part on the monitoring; and
perform, by the converged infrastructure management service, one or more remedial actions based at least in part on identifying the destabilization event.

13. The non-transitory computer-readable medium of claim 12, wherein the smart adaptor is configured with one or more features, and where configuring the smart adaptor comprises:
- determining, based at least in part on an identifier corresponding to the host machine, a subset of permitted features selected from the one or more features of the smart adaptor, the subset of permitted features being features that are permitted to be utilized at the host machine; and
- executing operations to cause the smart adaptor to 1) expose an interface associated with the subset of permitted features, or 2) restrict access to features other than the subset of permitted features.

14. The non-transitory computer-readable medium of claim 12, wherein executing the computer-executable instructions further causes the converged infrastructure management service to:
- initiate the auto-qualification process for pre-testing one or more images with the converged network interface card;
- boot, at the second host machine, each of the one or more images, the second host machine being configured to operate into an isolated network and configured with an instance of the converge network interface card; and
- associate each of the one or more images with a label that indicates a respective image is stable or unstable based at least in part on identifying whether a given image booted fully at the second host machine, wherein a corresponding image that is associated with an unstable label indicating the corresponding image is unstable is restricted from being deployed to infrastructure components, including the host machine, that are configured with the converged network interface card.

15. The non-transitory computer-readable medium of claim 12, wherein identifying the destabilization event further causes the converged infrastructure management service to provide input to a machine learning model trained to identify destabilization events from input data, the machine learning model being previously trained using a supervised learning algorithm and training data comprising training data examples individually being associated with corresponding operational data, or data generated from the corresponding operational data, and a known destabilization event label.

16. The non-transitory computer-readable medium of claim 12, wherein the operational data is obtained from at least one of: 1) an integrated lights out manager, 2) a baseboard management controller, 3) an agent operating at an operating system executing at the host machine, 4) a load balancer associated with the host machine, 5) the smart adaptor, or 6) the host network interface card of the host machine.

17. The non-transitory computer-readable medium of claim 12, wherein the operational data comprises at least one: 1) a reboot duration value, 2) a panic idle power draw value, 3) console logs or console log related data, 4) system event logs or system event log related data, 5) CPU power consumption data, or 6) network traffic flow data.

18. The computer-implemented method of claim 1, wherein configuring the smart adaptor comprises deploying, to the second storage partition, a software agent that provides third functionality that differs from the first functionality and the second functionality.

19. The computer-implemented method of claim 1, wherein the first storage partition and the second storage partition of the converged network interface card are physically and communicatively connected via a peripheral component interconnect express (PCIe) connection.

* * * * *